(12) United States Patent
Kawada

(10) Patent No.: US 7,056,605 B2
(45) Date of Patent: Jun. 6, 2006

(54) PERPENDICULAR MAGNETIC RECORDING MEDIUM AND METHOD OF MANUFACTURING THE SAME

(75) Inventor: Yasuyuki Kawada, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/647,094

(22) Filed: Aug. 22, 2003

(65) Prior Publication Data

US 2004/0110034 A1    Jun. 10, 2004

(30) Foreign Application Priority Data

| Sep. 4, 2002 | (JP) | ............................. 2002-259287 |
| Oct. 21, 2002 | (JP) | ............................. 2002-306144 |
| Feb. 7, 2003 | (JP) | ............................. 2003-031415 |
| May 21, 2003 | (JP) | ............................. 2003-144092 |

(51) Int. Cl.
*G11B 5/66*     (2006.01)
*G11B 5/70*     (2006.01)

(52) U.S. Cl. ................. 428/832.1; 427/131; 204/192.2

(58) Field of Classification Search ........ 428/694 TM, 428/694 TS, 336, 900, 611, 668, 832.1
See application file for complete search history.

(56) References Cited

U.S. PATENT DOCUMENTS

| 5,750,270 | A | * | 5/1998 | Tang et al. ................. 428/611 |
| 5,834,085 | A | * | 11/1998 | Lairson et al. ............ 428/828.1 |
| 6,596,418 | B1 | * | 7/2003 | Maesaka et al. ......... 428/694 T |
| 6,627,301 | B1 | * | 9/2003 | Shimizu et al. ............. 428/212 |
| 6,656,613 | B1 | * | 12/2003 | Litvinov et al. ..... 428/694 TM |
| 6,743,503 | B1 | * | 6/2004 | Chen .......................... 428/336 |
| 2002/0076579 | A1 | * | 6/2002 | Hanawa et al. ........ 428/694 TS |
| 2003/0175555 | A1 | * | 9/2003 | Usui ................... 428/694 TM |

FOREIGN PATENT DOCUMENTS

| JP | 2001-155329 A | 6/2001 |
| JP | 2002-25032 A | 1/2002 |
| JP | 2002-203306 A | 7/2002 |

OTHER PUBLICATIONS

Relevant portion of Search Report and Written Opinion dated Apr. 29, 2005 from Australian Patent Office.

* cited by examiner

*Primary Examiner*—Holly Rickman
(74) *Attorney, Agent, or Firm*—Rossi, Kimms & McDowell, LLP

(57) ABSTRACT

A perpendicular magnetic recording medium has high recording density and excellent read-write characteristics. The recording medium has a magnetic layer of a multilayered lamination structure composed of laminated cobalt layers mainly containing cobalt and noble metal layers of platinum or palladium. At least one of the cobalt layers and the noble metal layers contains at least one element selected from the group consisting of Ru, Ta, Nb, Mo, Mn, Cr, Si, and Ni, or an oxide, in a concentration ranging from 1 to 15 mol %. The magnetic layer is formed on an underlayer of ruthenium or the like for reducing magnetic interaction between the magnetic particles in the magnetic layer. The surface of the underlayer is treated for oxygen adsorption before depositing the magnetic layer to suppress magnetic interaction between the magnetic particles in the magnetic layer.

13 Claims, 23 Drawing Sheets

PERPENDICULAR MAGNETIC RECORDING MEDIUM AND METHOD OF MANUFACTURING THE SAME

BACKGROUND

Personal computers and work stations in recent years are provided with a magnetic recording device having a large capacity and yet a small size. Higher recording density of magnetic disks is needed to produce such devices. Present magnetic recording systems employ a longitudinal magnetic recording system, where the axis of easy magnetization is parallel to the plane of the magnetic recording medium. Enhancing recording density in this longitudinal magnetic recording system needs reduction of a product of remanent magnetization Br and thickness t of the magnetic film of the recording medium, as well as increase in coercive force Hc. Accordingly, efforts are being made to reduce the film thickness and control the grain size of the magnetic film.

The longitudinal magnetic recording system, however, has a problem of decrease in readback signal output due to decrease of residual magnetic flux density caused by enhancement of demagnetizing field, which results from shortened length of a bit. In addition, a problem of thermal fluctuation becomes significant with minimization of grain size and reduction of thickness of the magnetic film. In these circumstances, there is a perception that achieving higher density is technically difficult in the magnetic disks based on the longitudinal magnetic recording system.

On the other hand, to solve these problems and to improve areal recording density, a perpendicular magnetic recording system is being contemplated. A magnetic recording medium based on the perpendicular magnetic recording system is designed so that the axis of easy magnetization of the magnetic film orients perpendicularly to the substrate surface. Accordingly, adjacent magnetization in a transition region of magnetization does not oppose each other, and even short bit length preserves stable magnetization and magnetic flux does not decrease. Thus, the perpendicular magnetic recording system is appropriate to a magnetic recording method for a high density magnetic recording medium.

The perpendicular magnetic recording medium, despite these advantages, involves a disadvantage of high media noise due to relatively large magnetic interaction between magnetic particles in the magnetic layer, which is caused by insufficient segregation of nonmagnetic substance to the grain boundary region. Therefore, it is required to develop a material control technique for promoting the grain boundary segregation of nonmagnetic substance, to reduce media noise and enhance SN ratio. High recording density has to be achieved accompanying the reduction of noises and improvement of the SN ratio.

A structure of a known perpendicular magnetic recording medium comprises a soft magnetic backing layer formed on a nonmagnetic substrate of aluminum or glass, an underlayer for perpendicular orientation of a magnetic layer formed on the soft magnetic backing layer, a perpendicular magnetic recording layer on the underlayer, and a protective layer formed thereon. Such a medium is called "a double layer perpendicular magnetic recording medium." See, for example, Japanese Unexamined Patent Application Publication No. 2002-203306. Studies have been made on a perpendicular magnetic recording layer, including perpendicular magnetization films of cobalt based alloys such as Co—Cr, Co—Cr—Ta, and Co—Cr—Pt, multilayered lamination perpendicular magnetization films such as Pt/Co and Pd/Co, and amorphous perpendicular magnetization films such as Tb—Co and Tb—Fe—Co. Among them, the multilayered lamination perpendicular magnetization films including Pt/Co and Pd/Co exhibit large perpendicular magnetic anisotropy, high thermal stability, large coercive force, and is easier to achieve a squareness ratio approximately 1.0. Therefore, this type of perpendicular magnetization film is being studied extensively in an attempt to create a next generation recording medium having a high recording density. See, for example, Japanese Unexamined Patent Application Publication Nos. 2002-025032 and 2001-155329.

The reduction of media noise in a perpendicular magnetic recording medium having known multilayer structure is, however, not satisfactory yet, and further reduction of media noise and further improvement in read-write characteristics are required. Accordingly, there is a need for a perpendicular magnetic recording medium having high recording density and excellent read-write characteristics, with lower media noise.

SUMMARY OF THE PRESENT INVENTION

The present invention relates to a perpendicular magnetic recording medium and a method of manufacturing the same, in particular, to a perpendicular magnetic recording medium that exhibits high recording density and excellent read-write characteristics.

One aspect of the present invention is a perpendicular magnetic recording medium having a nonmagnetic substrate and a magnetic layer having a multilayered lamination structure of alternately laminated cobalt layers containing mainly cobalt and noble metal layers of platinum or palladium. At least one of the cobalt layers and the noble metal layers contains at least one element selected from the group consisting of Ru, Ta, Nb, Mo, Mn, Cr, Si, and Ni, or at least one oxide.

The content of at least one element or one oxide can range from 1 to 15 at %. The cobalt layers can contain silicon oxide ranging from 5 to 11 mol %, and the noble metal layers can be composed of platinum and can contain silicon oxide ranging from 1 to 8 mol %. Each of the cobalt layers can have a thickness ranging from 0.2 to 0.8 nm and each of the noble metal layers can have a thickness ranging from 0.05 to 1.2 nm.

The recording medium can further include an underlayer between the magnetic layer and the substrate, the magnetic layer being formed directly on the underlayer. The underlayer can be composed of a platinum film, a palladium film, a ruthenium film, or a laminated structure of platinum and palladium films. The thickness of the underlayer can range from 1 to 20 nm.

The recording medium can further include an orientation control layer between the substrate and the underlayer for controlling crystalline orientation of the underlayer. The orientation control layer is composed of a lamination of a first seed layer and a second seed layer, and a composition of the second seed layer can be selected to orient the underlayer in a c-crystal axis. The first seed layer can be composed of a tantalum layer and the second seed layer can be composed of a layer selected from a NiFeCr layer, a NiFeNbB layer, and a NiFeSi layer. The thickness of the first seed layer can range from 1 to 10 nm, and the thickness of the second seed layer can range from 5 to 20 nm.

The recording medium can further include a soft magnetic backing layer between the substrate and the first seed layer.

The soft magnetic backing layer can be composed of a CoZrNb alloy or a CoZrTa alloy having a thickness ranging from 50 to 400 nm.

Another aspect of the present invention is a method of manufacturing the above mentioned perpendicular magnetic recording medium by providing the nonmagnetic substrate and depositing, on the nonmagnetic substrate, the magnetic layer. The magnetic layer can be deposited with a sputtering gas containing oxygen ranging from 0.05 to 0.5% in a relative mass flow rate. The underlayer can be deposited on the substrate before depositing the magnetic layer. The underlayer and the magnetic layer can be deposited using a sputtering gas selected from krypton, xenon, a mixture of krypton and argon, and a mixture of xenon and argon.

The method can further include adsorbing oxygen on the surface of the underlayer after depositing the underlayer and before depositing the magnetic layer by exposing the surface of the underlayer to argon gas containing 1 to 10% of oxygen in relative mass flow rate under a pressure ranging from 0.1 to 10 Pa for 1 to 20 seconds.

BRIED DESCRIPTION OF THE DRAWINGS

Figure 6:
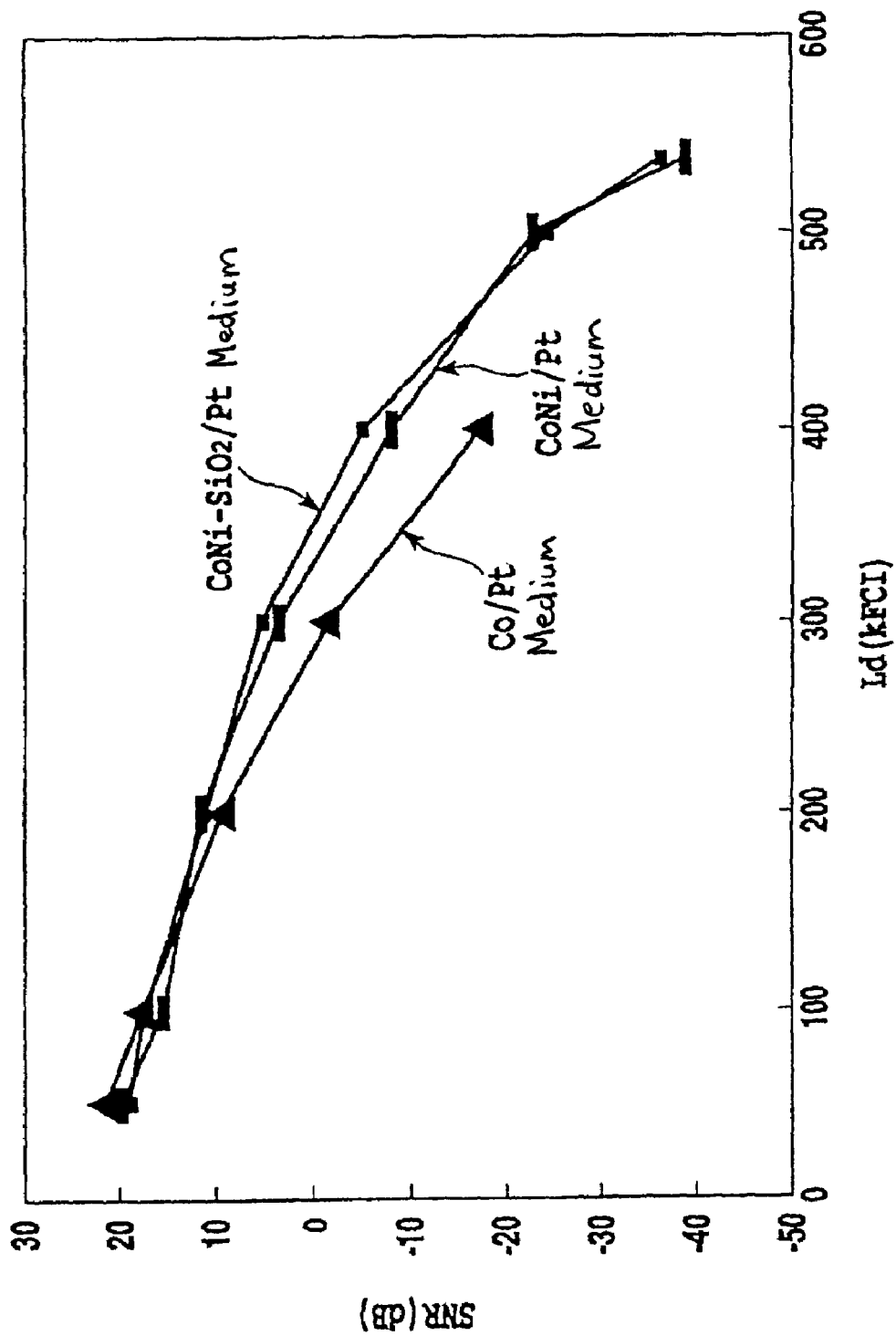

FIG. 6 illustrates read-write characteristics (specifically, SN characteristics) of a perpendicular magnetic recording medium having a magnetic layer of a multilayered lamination film structure consisting of pure cobalt layers and pure platinum layers (Co/Pt medium), consisting of cobalt layers containing mainly cobalt (95 at % Co-5 at % Ni) and platinum layers (CoNi/Pt medium), and consisting of cobalt layers containing mainly cobalt (90 mol % (95 at % Co-5 at % Ni)-10 mol % $SiO_2$) and platinum layers (CoNi—$SiO_2$/Pt medium).

Figure 7:
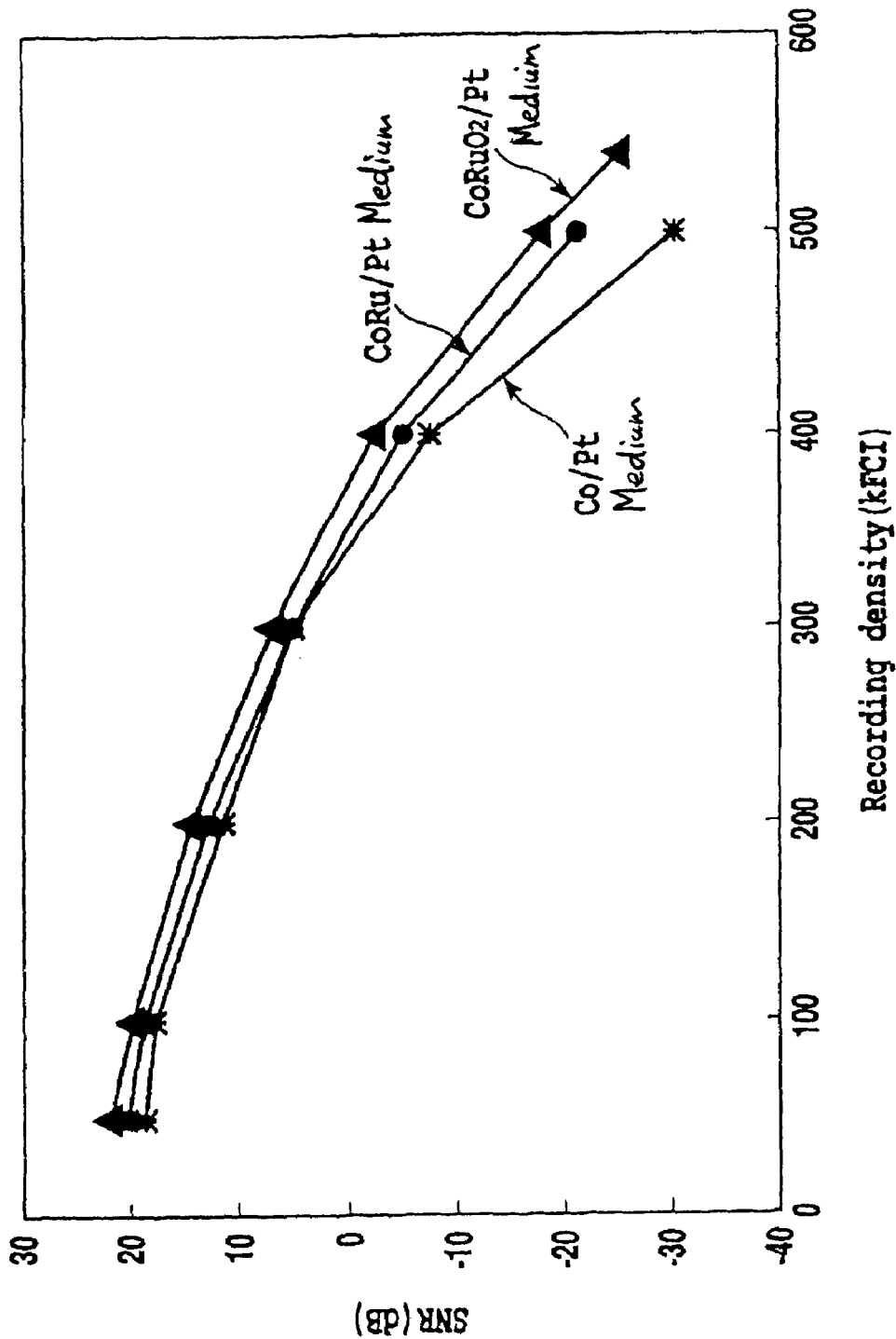

FIG. 7 illustrates read-write characteristics (specifically, SN characteristics) of a perpendicular magnetic recording medium having a magnetic layer of a multilayered lamination film structure consisting of pure cobalt layers and pure platinum layers (Co/Pt medium), consisting of cobalt layers containing mainly cobalt (95 at % Co-5 at % Ru) and platinum layers (CoRu/Pt medium), and consisting of cobalt layers containing mainly cobalt (99.8 mol % (95 at % Co-5 at % Ni)-0.2 mol % $O_2$) and platinum layers (CoRuO$_2$/Pt medium).

Figure 8:
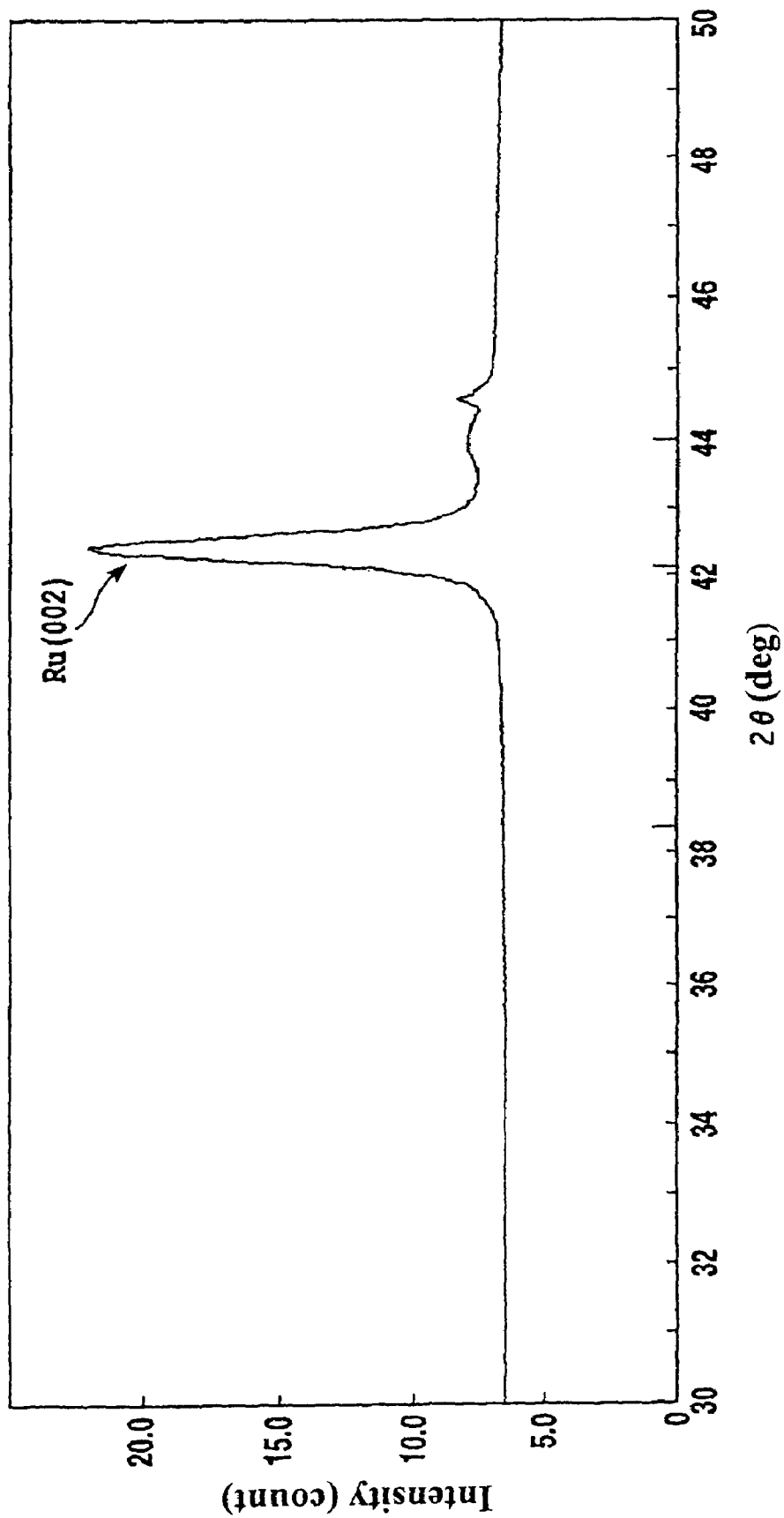

FIG. 8 illustrates an effect of the crystal orientation control layer included in a perpendicular magnetic recording medium according to the present invention.

Figure 9:
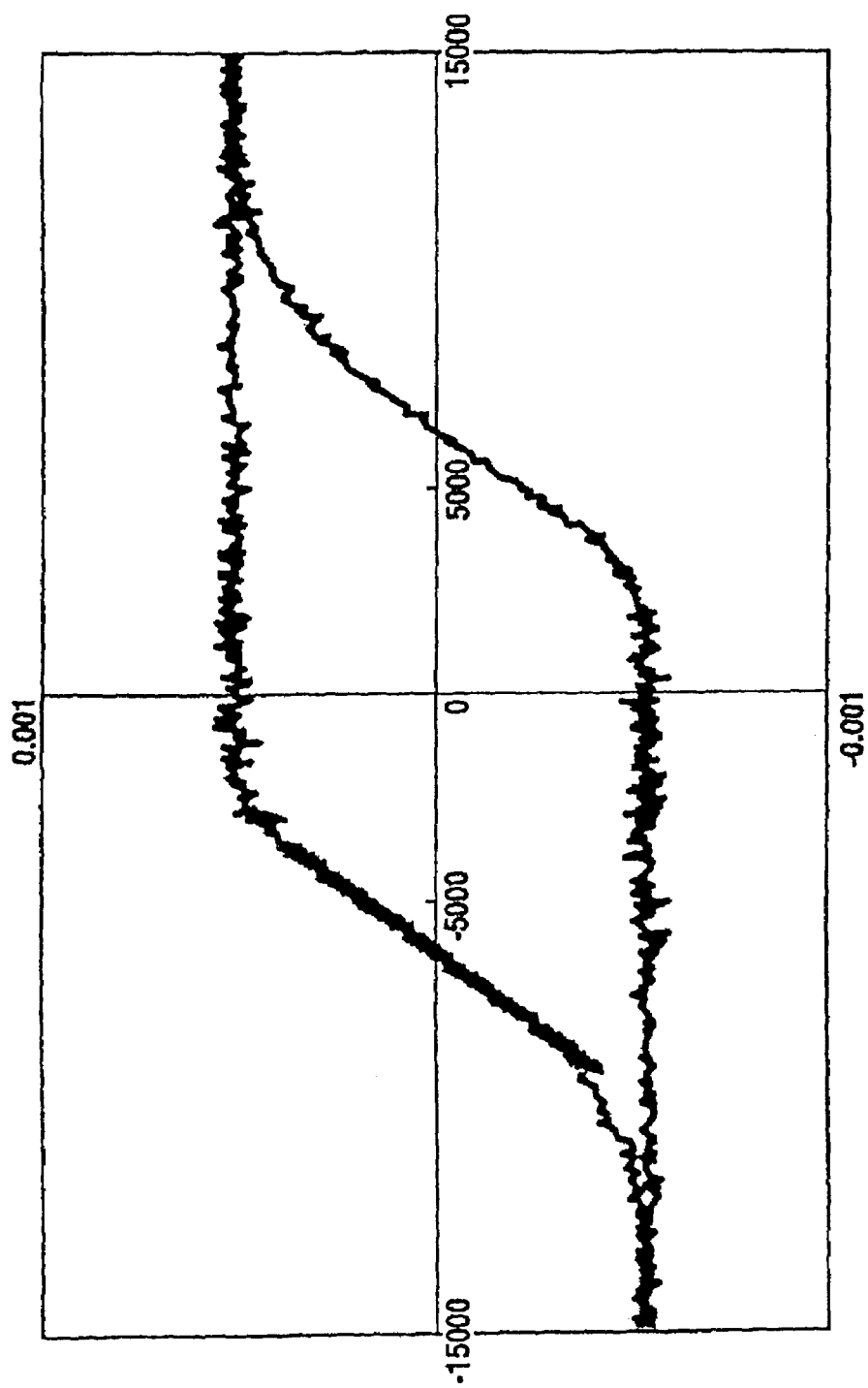

FIG. 9 illustrates the effect of oxygen adsorption on the surface of the underlayer.

Figure 10:
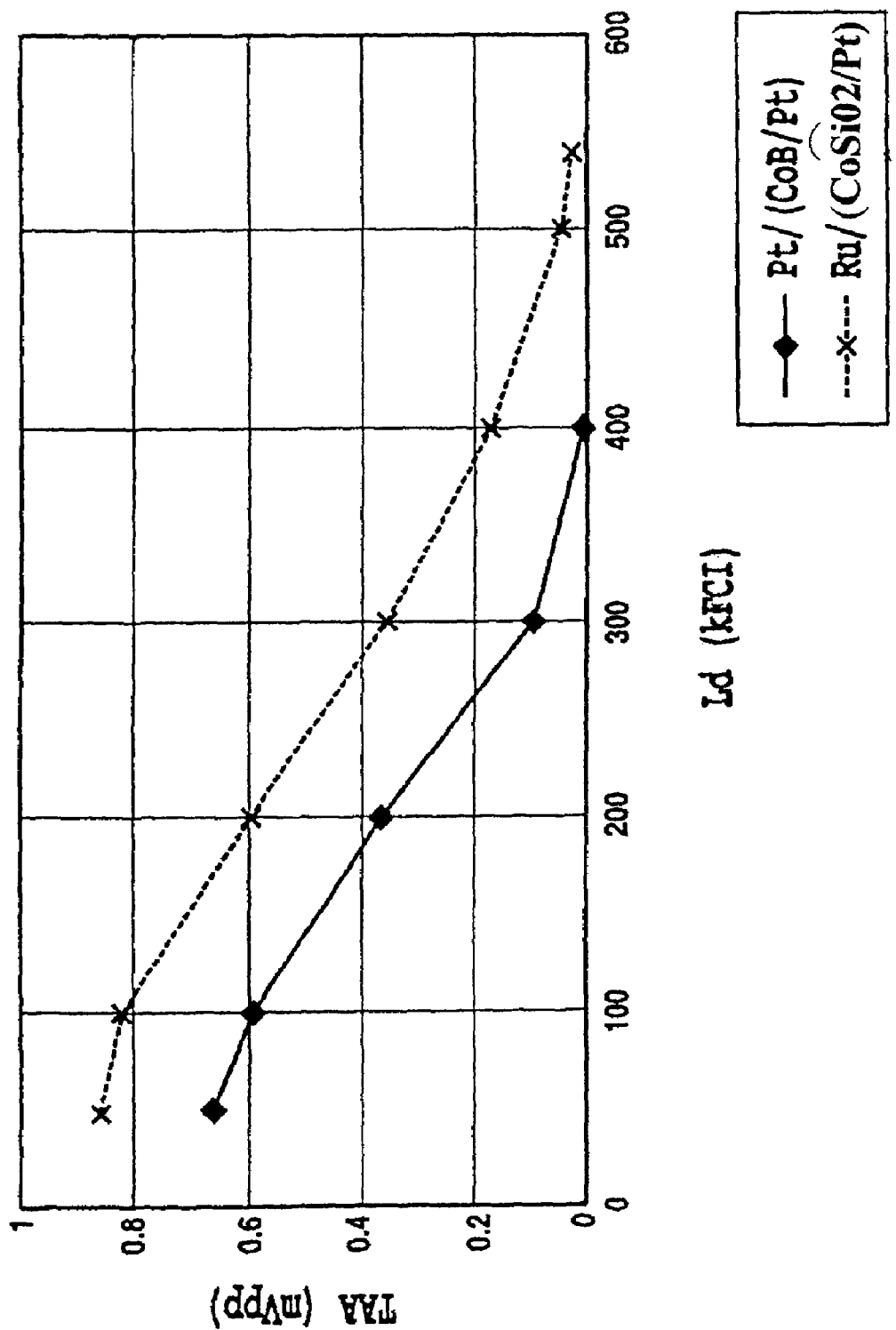

FIG. 10 illustrates the comparison of the readback signal output, which is a read-write characteristic, of a conventional magnetic recording medium and a magnetic recording medium according to the present invention.

Figure 11:
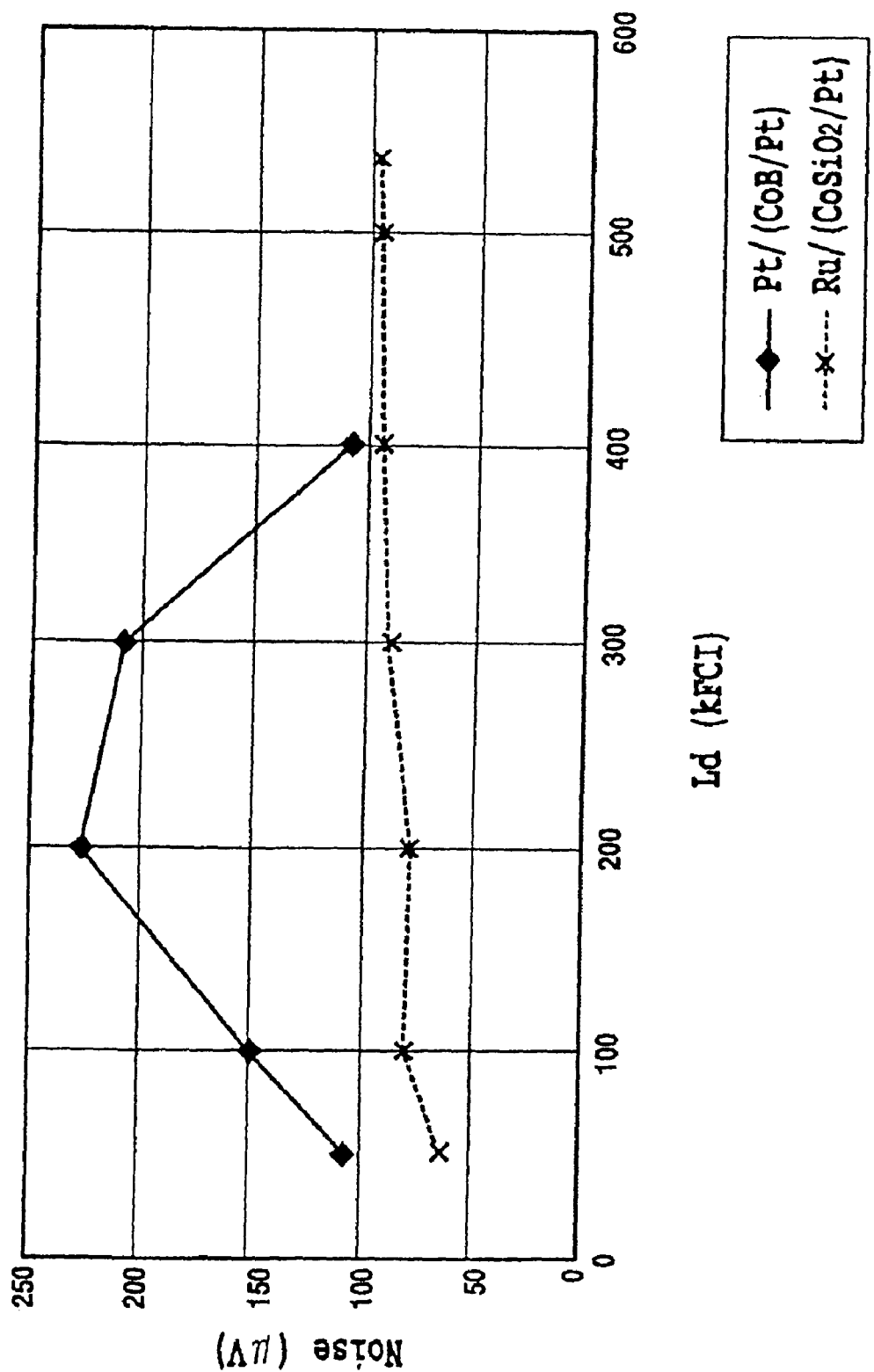

FIG. 11 illustrates the comparison of the media noise, which is a read-write characteristic, of a conventional magnetic recording medium and a magnetic recording medium according to the present invention.

Figure 12:
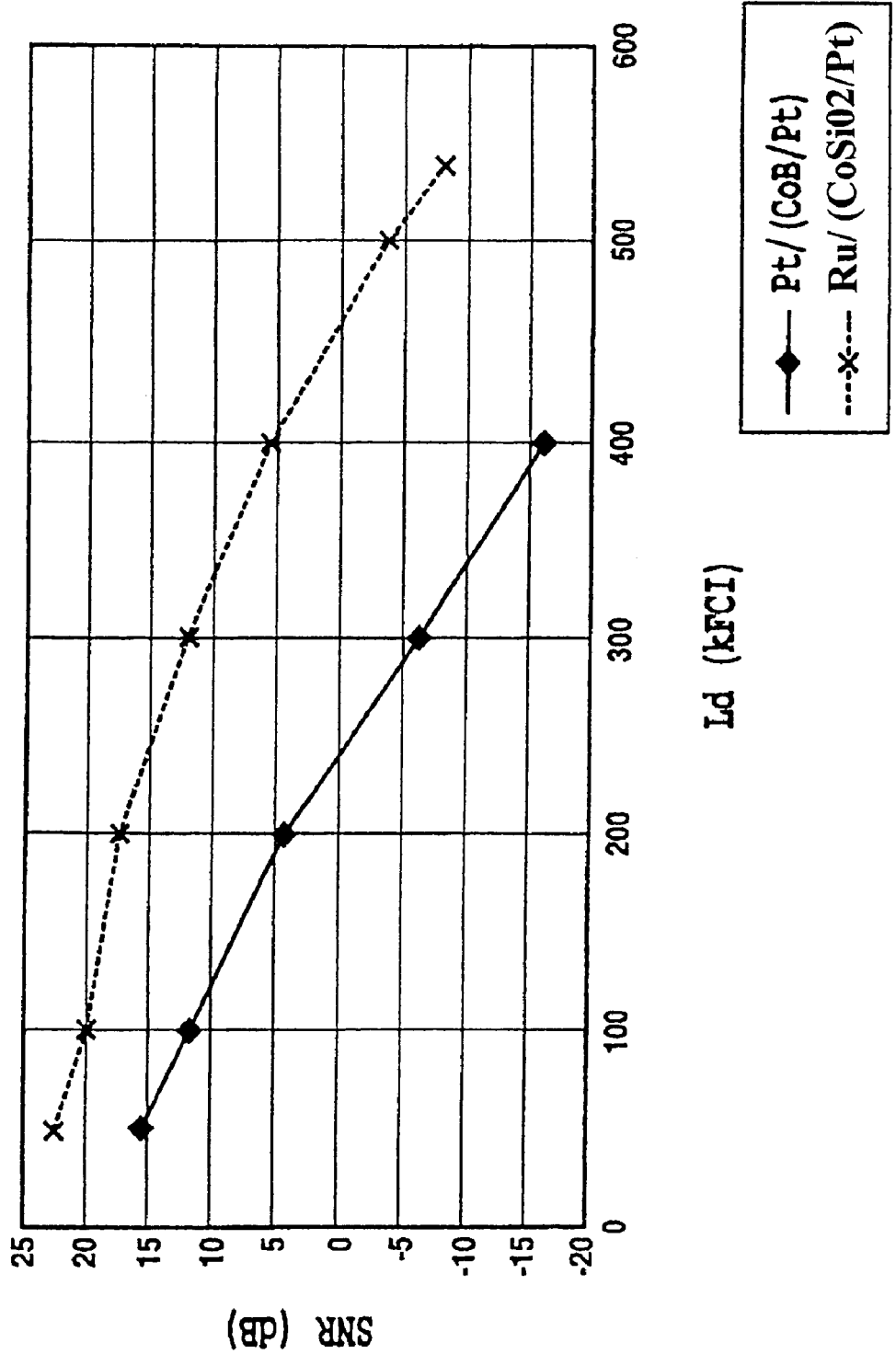

FIG. 12 illustrates the comparison of SNR, which is a read-write characteristic, of a conventional magnetic recording medium and a magnetic recording medium according to the present invention.

Figure 13:
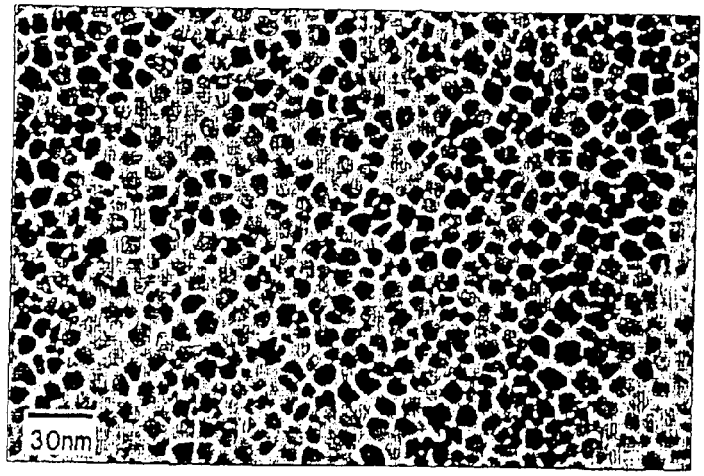
Figure 13:
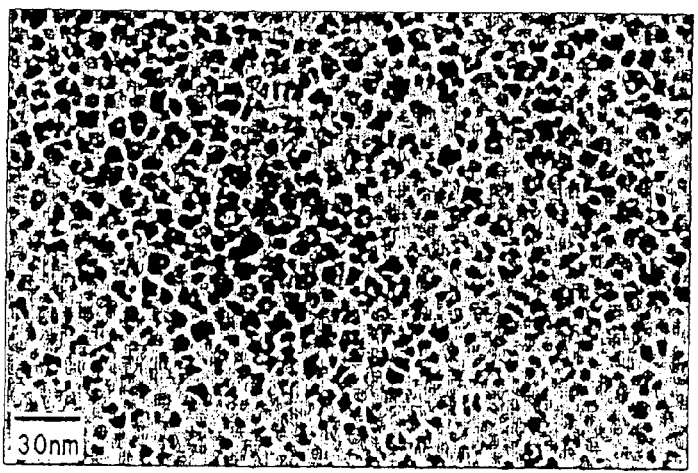

FIGS. 13(a) and 13(b) are planar TEM images illustrating the diameter of magnetic particles and the width of non-magnetic grain boundary in the Co—$SiO_2$ layer constituting the magnetic layer.

Figure 14:
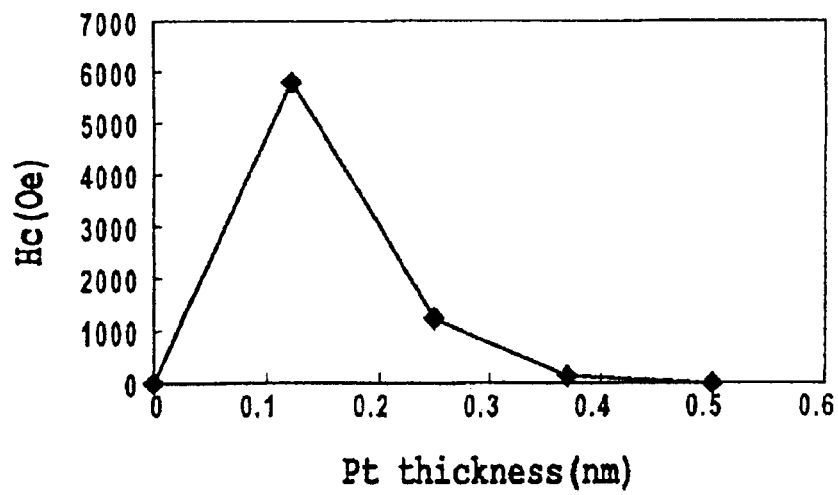
Figure 14:
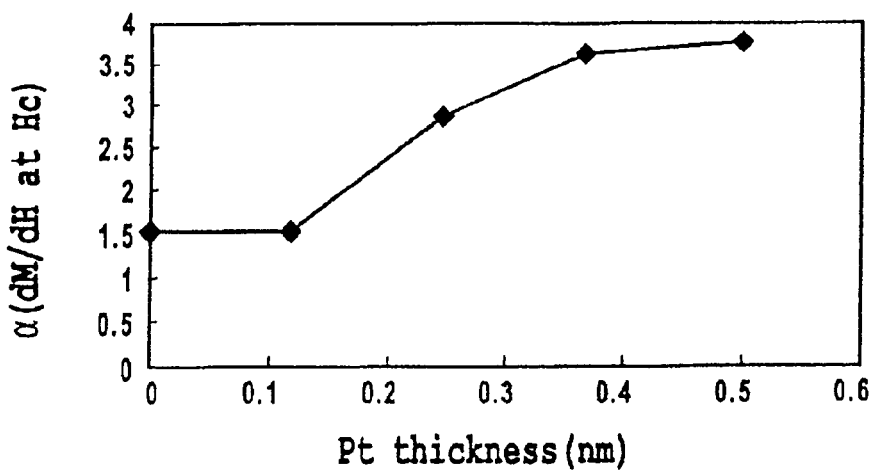

FIGS. 14(a) and 14(b) illustrate the variation of the magnetic characteristics in relation to the variation of the thickness of a platinum layer.

Figure 15:
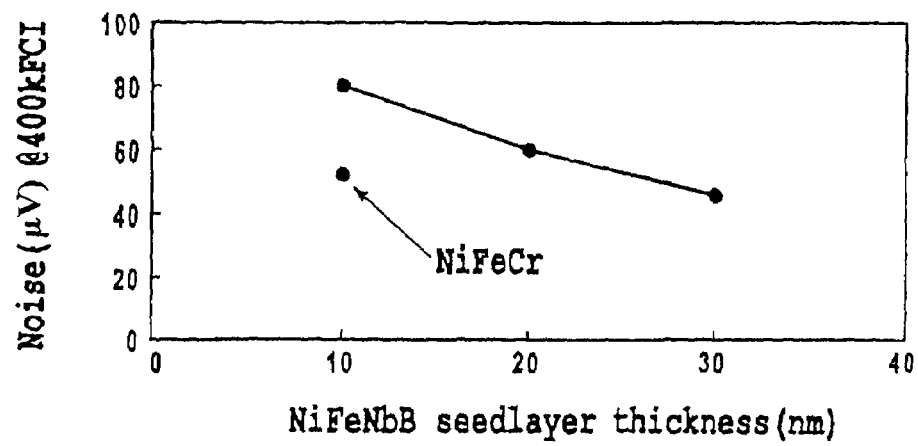
Figure 15:
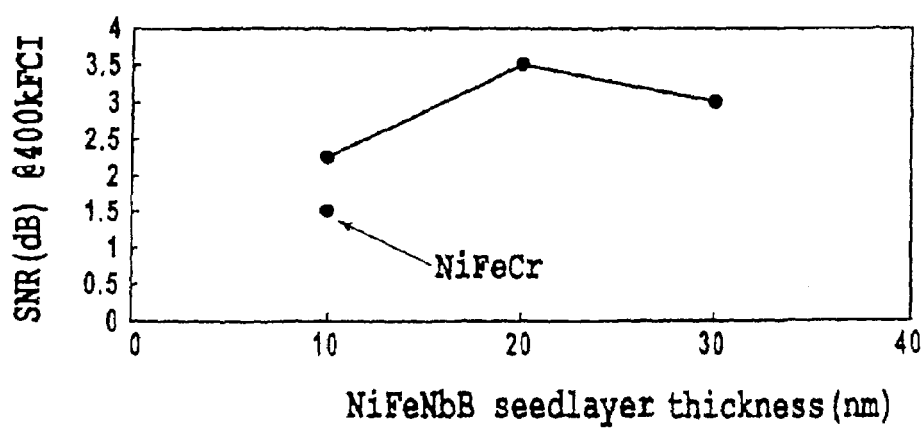

FIGS. 15(a) and 15(b) illustrate the variation of the magnetic characteristics in relation to the variation of the thickness of the NiFeNbB layer.

Figure 16:
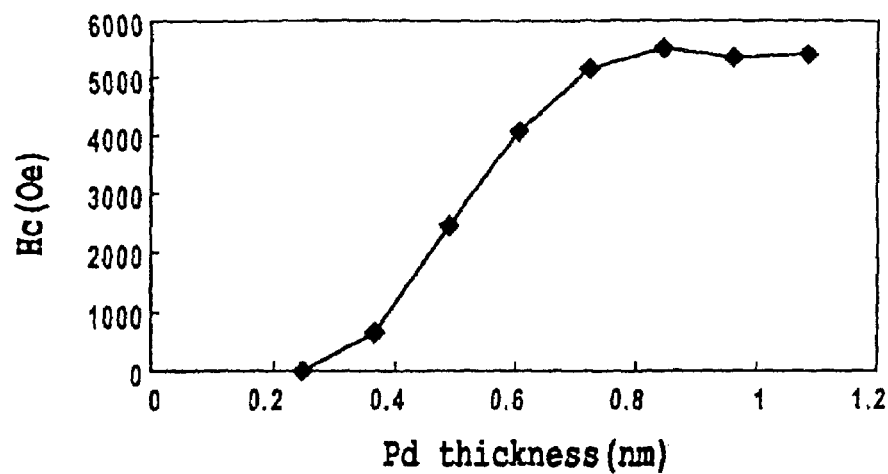
Figure 16:
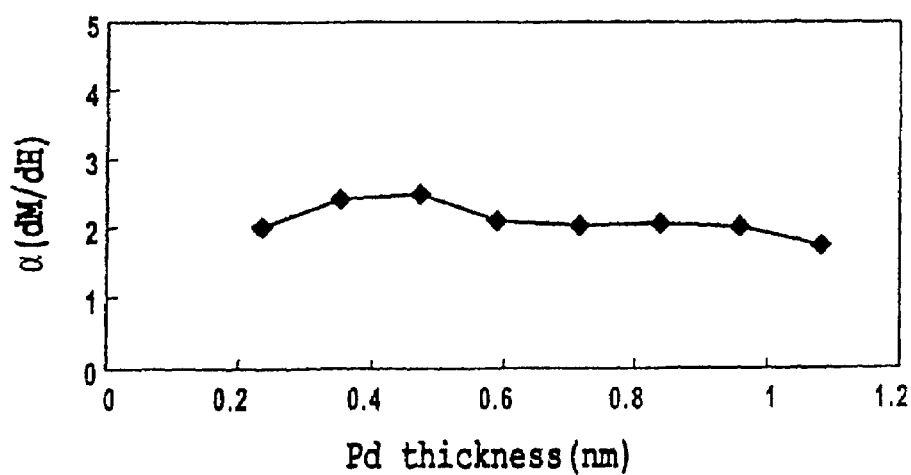

FIGS. 16(a) and 16(b) illustrate the variation of the magnetic characteristics in relation to the variation of the thickness of a palladium layer.

Figure 17:
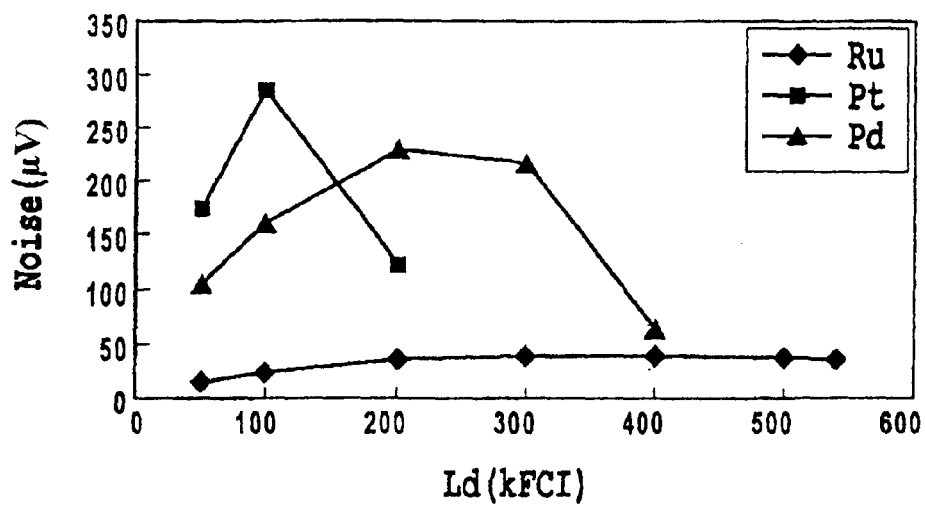
Figure 17:
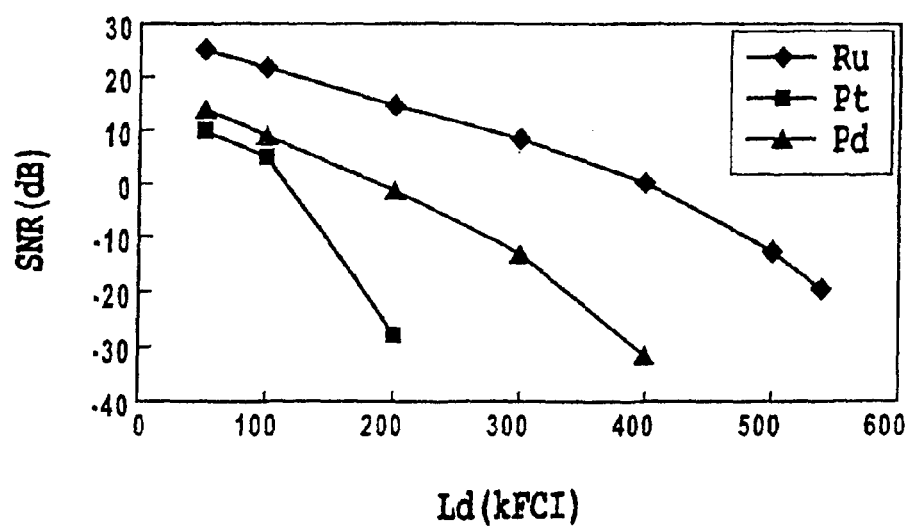

FIGS. 17(a) and 17(b) illustrate the effect of the ruthenium underlayer on the magnetic characteristics of a magnetic layer of Co—$SiO_2$/Pd multilayered lamination structure.

Figure 18:
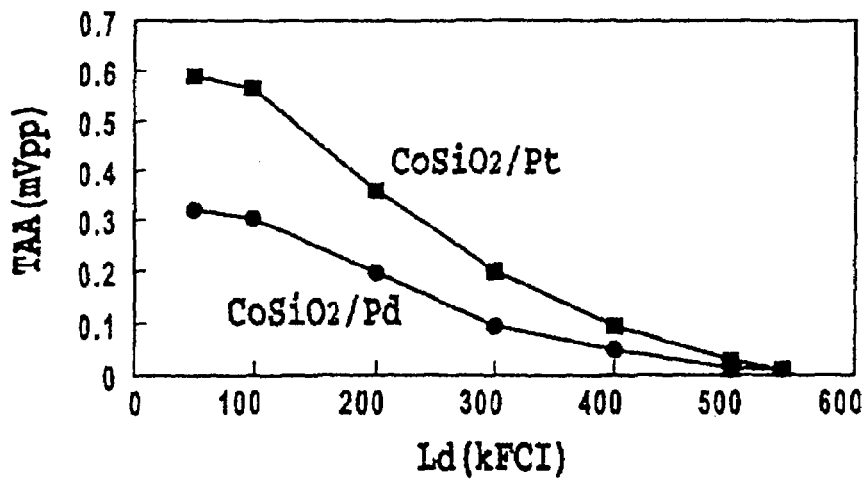
Figure 18:
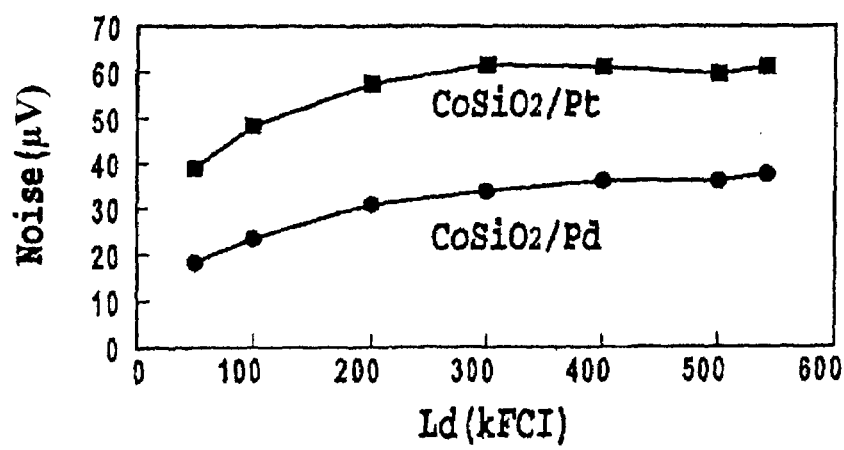
Figure 18:
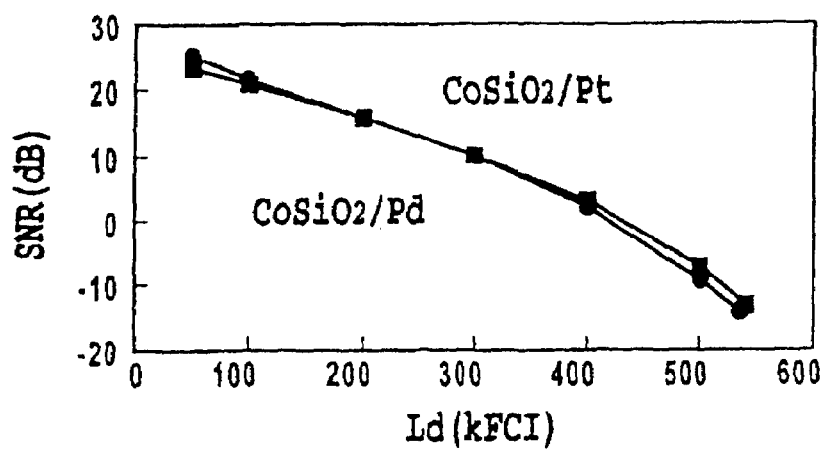

FIGS. 18(a), 18(b), and 18(c) illustrate the read-write characteristics measured on the perpendicular magnetic recording medium having a magnetic layer of Co—$SiO_2$/Pt multilayered lamination structure of the fourth example according to the present invention and a magnetic layer of Co—$SiO_2$/Pd multilayered lamination structure of the fifth example according to the present invention.

Figure 19:
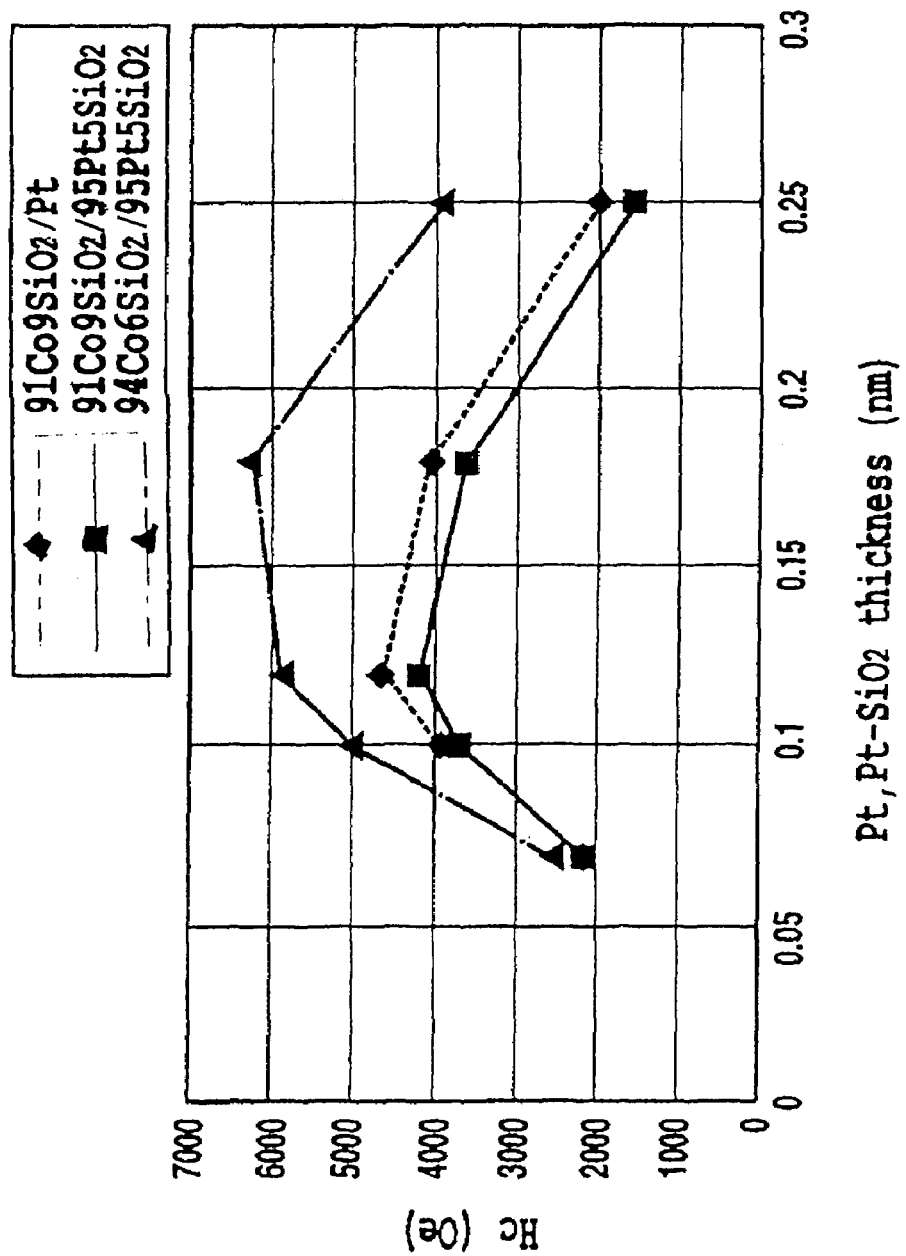

FIG. 19 illustrates Hc of three types of a perpendicular magnetic recording media in relation to the thickness of noble metal layers of a magnetic layer of a multilayered lamination film structure of 91 mol % Co-9 mol % $SiO_2$/95 mol % Pt-5 mol % $SiO_2$, of 94 mol % Co-6 mol % $SiO_2$/95 mol % Pt-5 mol % $SiO_2$, and of 91 mol % Co-9 mol % $SiO_2$/Pt.

Figure 20:
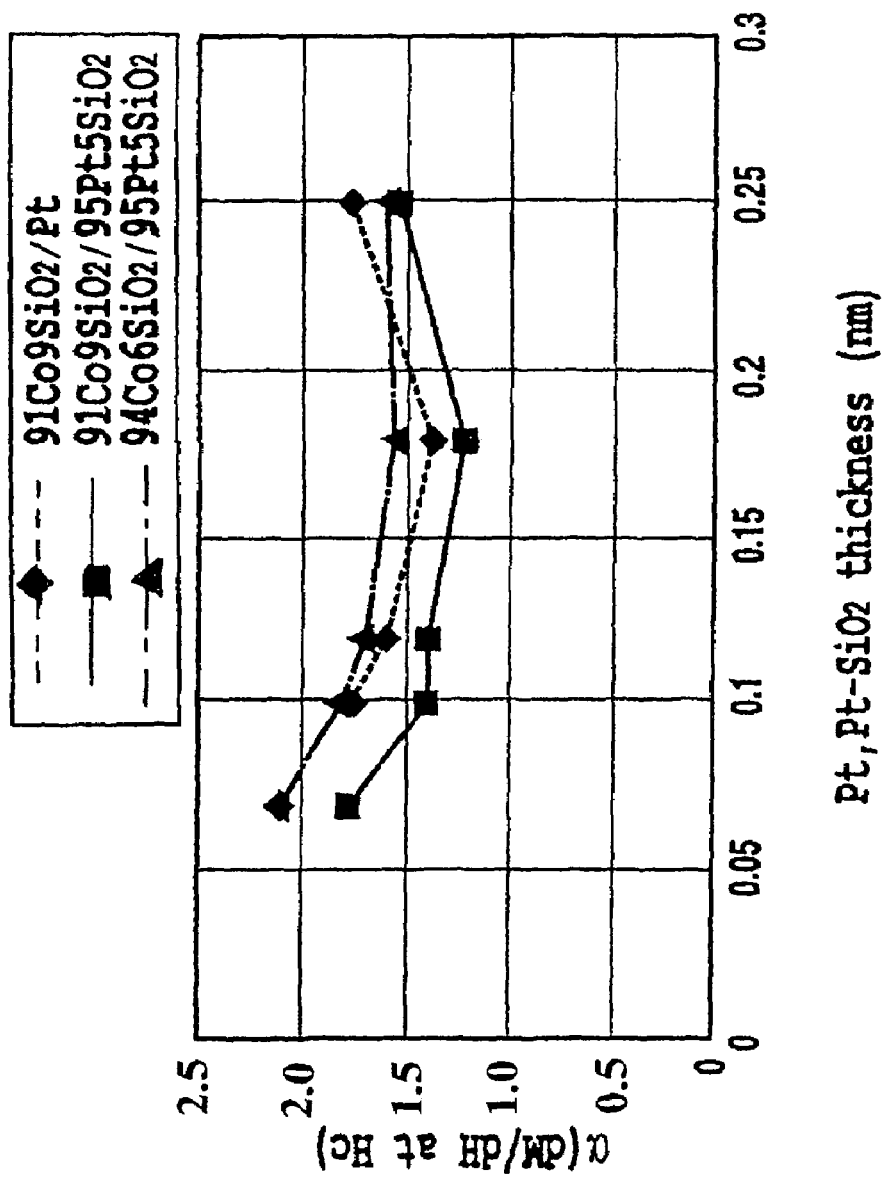

FIG. 20 illustrates the relationship between the values of gradient α in the magnetization curve around the Hc point and the thickness of the noble metal layer obtained on the three types of perpendicular magnetic recording media of FIG. 19

Figure 21:
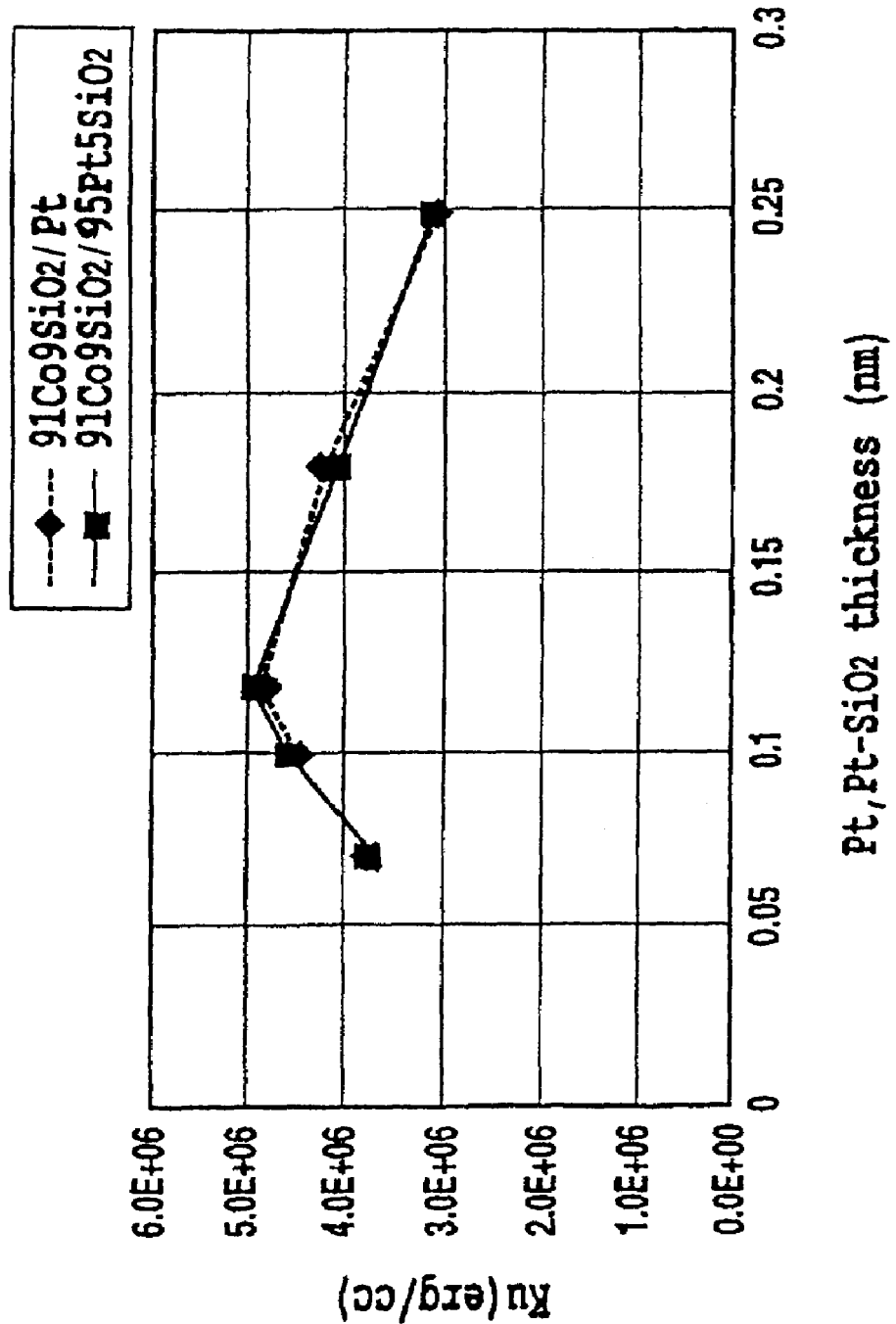

FIG. 21 illustrates the dependence of magnetic anisotropy constant Ku on the thickness of the noble metal layer for media of a magnetic layer of a multilayered lamination film structure of 91 mol % Co-9 mol % $SiO_2$/95 mol % Pt-5 mol % $SiO_2$ and of a multilayered lamination film of 91 mol % Co-9 mol % $SiO_2$/Pt.

Figure 22:
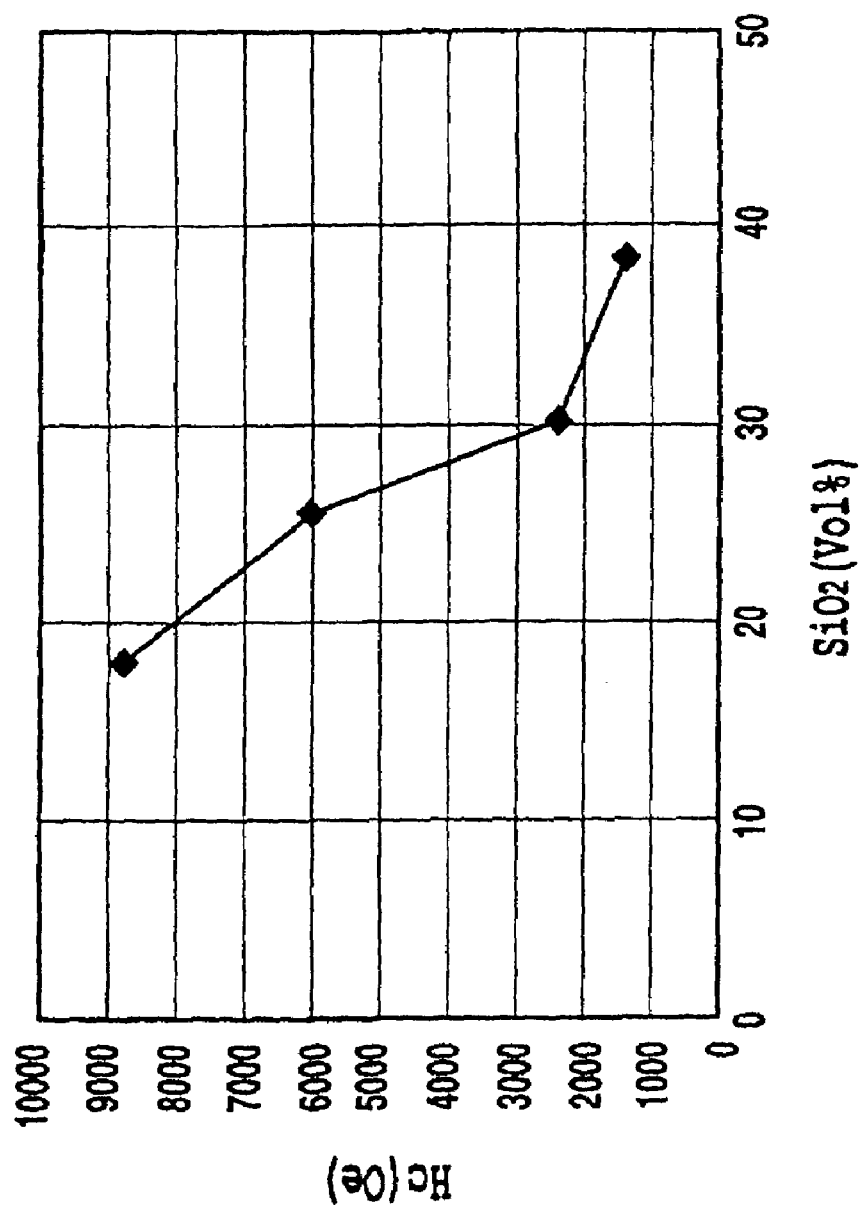

FIG. 22 illustrates the result of the Hc measurement on the medium comprising a magnetic layer of a multilayered lamination film structure of Co—$SiO_2$/Pt containing 18 to 38 vol % of $SiO_2$ in the cobalt layer.

Figure 23:
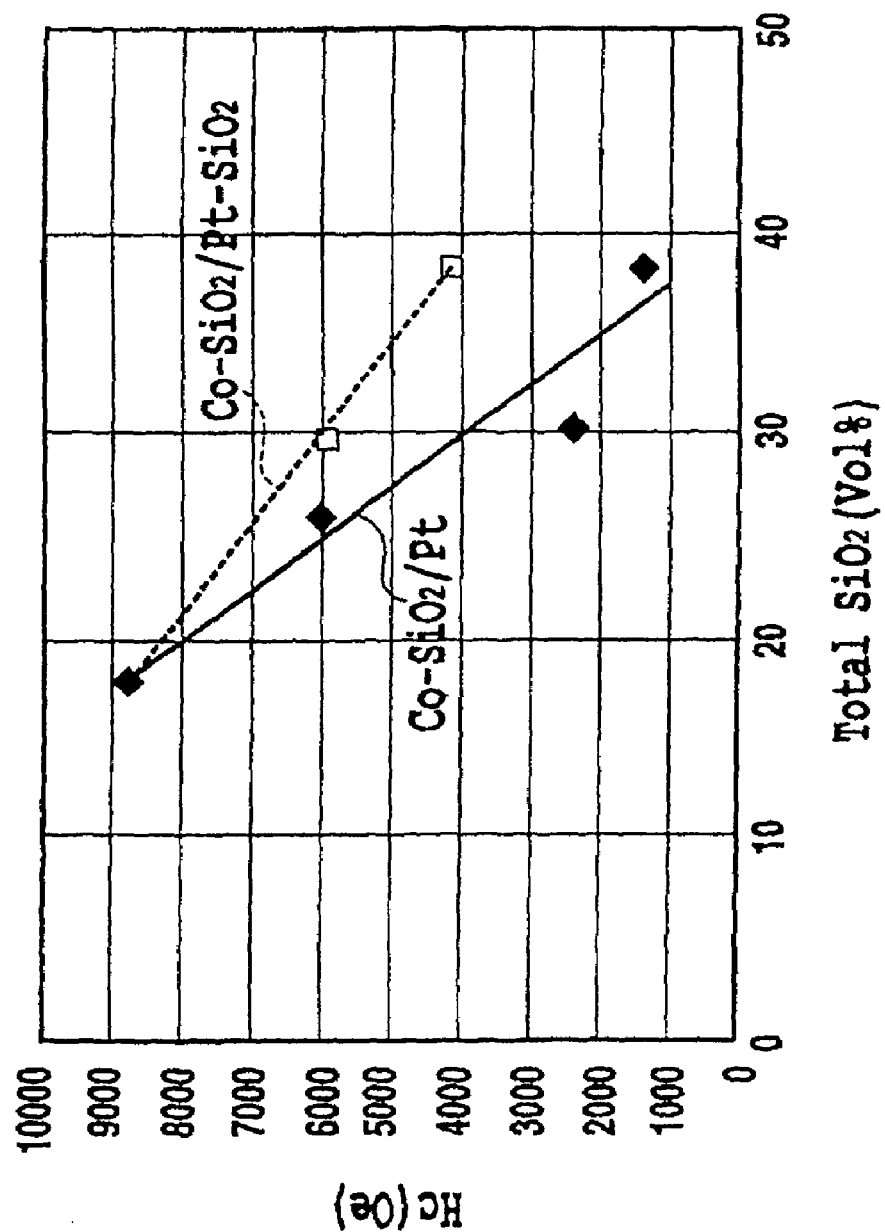

FIG. 23 illustrates the effect on the Hc value of $SiO_2$ addition into the platinum layer.

DETAILED DESCRIPTION

Figure 1:
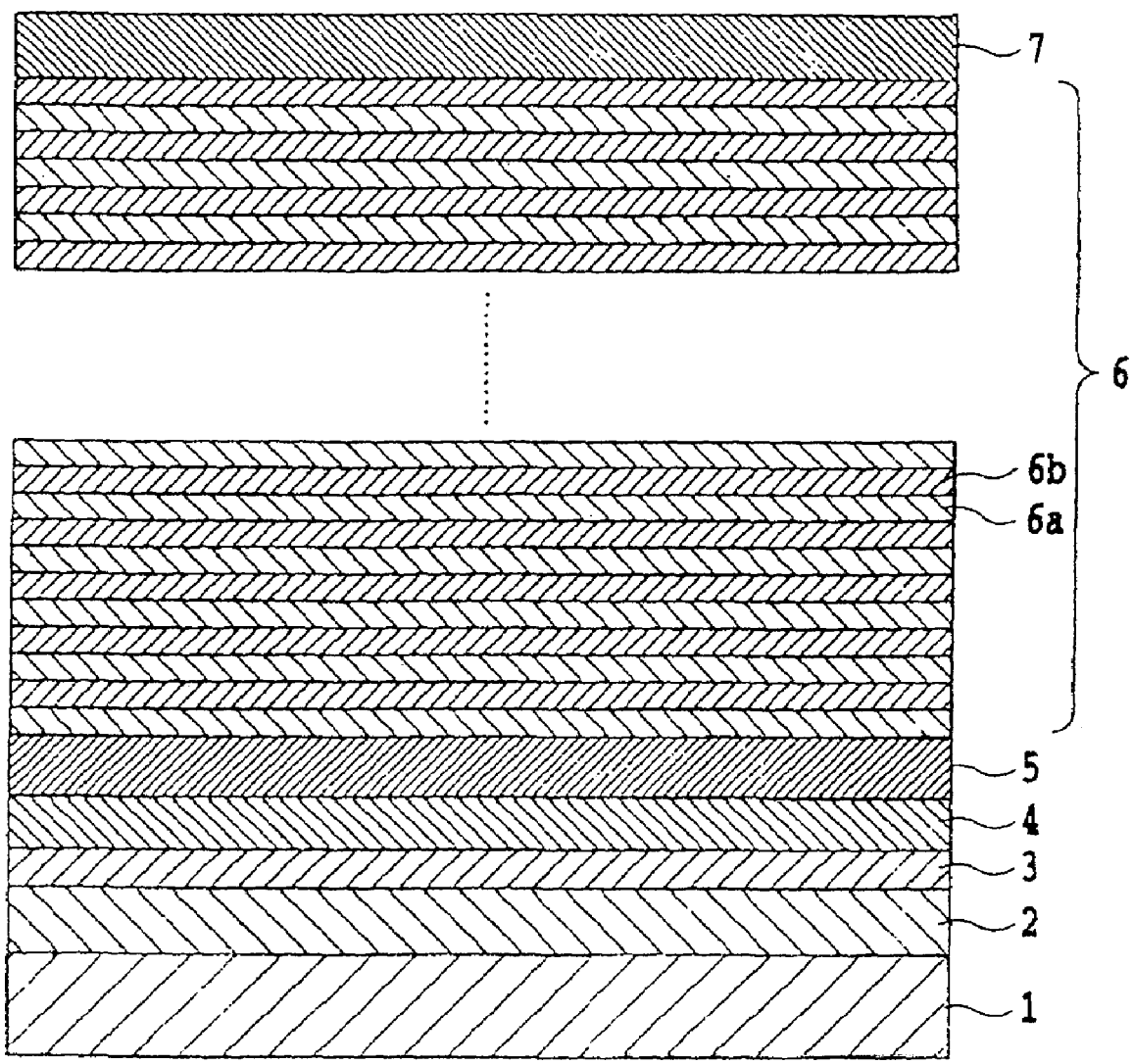
FIG. 1 illustrates an example of structure of a perpendicular magnetic recording medium according to the present invention.

FIG. 1 illustrates the basic structure of an example of a perpendicular magnetic recording medium according to the present invention. The medium comprises a nonmagnetic substrate 1 made of aluminum or glass, a backing layer 2, an orientation control layer 3, 4, an underlayer 5, a perpendicularly oriented magnetic layer 6, and a protective layer 7, laminated in this sequence.

The basic feature of a perpendicular magnetic recording medium according to the present invention exists in the magnetic layer 6 having a multilayered lamination film structure of laminated cobalt layers and platinum layers. At least one of the cobalt layers and the platinum layers contain an oxide of a metal, for example, silicon. The magnetic layer 6 is formed directly on the underlayer 5, which reduces the magnetic interaction between the magnetic particles contained in the magnetic layer 6. The underlayer 5 can be a platinum film, a ruthenium film, a palladium film, or a platinum and palladium lamination film. The oxide added to the magnetic layer 6 can be a stoichiometric composition. When the additive oxide is a silicon oxide, for example, the oxide can have a composition $SiO_2$, while the silicon oxide generally has a composition $SiO_x$, where $0<x\leq2$. The backing layer 2 and the orientation control layer 3, 4 shown in FIG. 1 can be added between the underlayer 5 and the substrate 1 to improve the performance of the perpendicular magnetic recording medium, although a perpendicular magnetic recording medium can omit those layers.

The underlayer 5 can be composed of platinum, ruthenium, or the like, having the thickness in ranging from 1 to 20 nm. The magnetic performance of the magnetic layer 6 can be enhanced by forming the magnetic layer 6 after giving oxygen adsorption treatment to the surface of the underlayer 5. The oxygen adsorption on the underlayer surface suppresses the magnetic interaction between the magnetic particles in the magnetic layer 6 formed on the underlayer 5, and loosens the gradient in the magnetization curve of the magnetic layer 6 around the Hc point, enhancing read-write ability.

The magnetic layer 6 has a basic structure of Co/Pt based multilayered lamination film of cobalt layers 6a containing mainly cobalt and noble metal layers 6b of platinum, both of which can contain silicon oxide ($SiO_x$), resulting in a multilayered lamination film having a composition of $Co$—$SiO_2$/$Pt$—$SiO_2$. The silicon oxide contained therein can range from 1 to 15 mol %, in particular 5 to 11 mol % in each of the cobalt layers, and 1 to 8 mol % in each of the platinum layers.

Although both the cobalt layers and the platinum layers in the above example contain silicon oxide, only one of the cobalt layers and the platinum layers can contain silicon oxide, as mentioned earlier. The magnetic layer 6 can be composed of a multilayered lamination film of cobalt layers and palladium layers (Co/Pd based) instead of being Co/Pt based. In the case of the multilayered lamination structure of Co/Pd based structure, the silicon oxide also can be contained either in both the cobalt layers and the palladium layers or in only one of the cobalt layers and the palladium layers. Instead of the silicon oxide (or in addition to the silicon oxide), at least one additive can be selected from the group consisting of Ru, Ta, Nb, Mo, Mn, Cr, and Ni, and an oxide.

The reason for provision of the underlayer 5 having oxygen adsorbed on the surface thereof in a perpendicular magnetic recording medium of the invention is to control the gradient of the magnetization curve near the point of coercive force Hc of the magnetic layer 6 formed on the underlayer 5. The reason for employing a Co/Pt based multilayered lamination film for the magnetic layer 6 is because such a magnetic layer provides a large value of Hc as compared with a magnetic layer of Co—Cr alloy, readily achieves a squareness ratio of 1, and brings about large crystalline magnetic anisotropy, taking advantage of interface magnetic anisotropy. The reason for adding silicon oxide to either one or both of the cobalt layer and the platinum/palladium layer of the multilayered lamination film structure is for enhancing Hc and improving read-write characteristics. The added nonmagnetic silicon oxides segregate in the region between the magnetic particles constituting the cobalt layer and the platinum layer, and minimize and isolate each magnetic particle. Thus, Hc can be increased and higher recording density can be achieved in comparison with a magnetic layer like Co/Pt that does not contain silicon oxide.

Although the thickness of each of the layers constituting the magnetic layer can be varied corresponding to the intended magnetic property, each of the cobalt layers can range 0.2 to 0.8 nm, preferably 0.2 to 0.5 nm; each of the platinum layers can range 0.05 to 1.2 nm in thickness, preferably 0.05 to 0.25 nm. The magnetic layer 6 can be deposited by a sputtering method using a sputtering gas of argon, krypton, xenon, or a mixture of these gases. The sputtering gas can contain 0.05 to 0.5% of oxygen in a relative mass flow rate.

The orientation control layer 3, 4 is provided for the purpose of crystal orientation (c-axis orientation) of the underlayer 5. The orientation control layer 3, 4 can be composed of laminated two layers: a first seed layer 3 of tantalum and a second seed layer 4 of NiFeCr. The second seed layer can be composed of NiFeNbB or NiFeSi, as well. By enhancing the c-axis orientation of the underlayer 5, the crystal orientation of the magnetic layer 6 formed on the underlayer 5 can also be enhanced, thereby improving the magnetic performance of the magnetic layer 6. The tantalum layer and the NiFeCr layer composing an orientation control layer of two layer structure can have a thicknesses ranging from 1 to 10 nm and 5 to 20 nm, respectively. The composition of the NiFeCr layer is determined to not degrade the crystallinity and the orientation of the underlayer of a ruthenium film, and appropriately can be selected in the range of 50 to 70 at % Ni, 10 to 20 at % Fe, and 20 to 30 at % Cr.

The backing layer 2 can be provided for enhancing writing ability using a recording head, and can be composed of, for example, a soft magnetic film of CoZrNb or CoZrTa having a thickness ranging from 50 to 400 nm.

The present invention will be described more in detail referring to examples of preferred embodiments of a perpendicular magnetic recording medium according to the invention.

A first example of according to the present invention comprises a substrate 1 of glass, a backing layer 2 of CoZrNb film, an underlayer 5 of a platinum film, a protective layer 7 of a carbon film, and a magnetic layer 6 of multilayered lamination of cobalt layers 6a composed mainly of cobalt, namely $CoNi$—$SiO_2$ and noble metal layers 6b composed of platinum. The perpendicular magnetic recording medium of the first example can be manufactured according to the following method. The substrate 1 made of glass having a diameter of 3.5 inches and a thickness of 1 mm. The particular diameter and the thickness of the substrate, however, are not critical, and the substrate 1 can be made of an aluminum substrate plated with Ni—P and subjected to an appropriate texturing. After adequately cleaning the substrate 1, a backing layer 2 of a CoZrNb film is formed on the substrate by sputtering. The target used for sputtering in this example has a composition of 87 at % Co-5 at % Zr-8 at % Nb. The backing layer 2 was sputtered to a film thickness of 200 nm at the room temperature using sputtering gas of argon at a pressure of about 1 Pa. The CoZrNb film exhibits adequate soft magnetic performance notwithstanding of the amorphous state of the film that is deposited at room temperature. Subsequently, an underlayer 5 of platinum was deposited by sputtering on the CoZrNb film. The target used was pure platinum. The underlayer 5 was sputtered to a thickness of about 10 nm at room temperature using a mixed gas of Kr+4% Ar+0.2% $O_2$ in relative mass flow rate at a pressure of about 5 Pa. On the platinum underlayer 5, a magnetic layer 6 of a multilayered lamination film of CoNi—$SiO_2$/Pt is formed by sputtering. The composition of the target used was an alloy of 95 at % Co-5 at % Ni with an addition of 10 mol % $SiO_2$ for the cobalt layer and pure platinum for the platinum layer. These targets were simultaneously discharged and sputtered while rotating, to deposit a CoNi—$SiO_2$ layer and a platinum layer alternately. The cobalt layer and the platinum layer were sputtered to a film thickness of 0.45 nm for each of the CoNi—$SiO_2$ layers and 0.4 nm for each of the platinum layers at room temperature using a mixed gas of Kr+4% Ar+0.2%$O_2$ in relative mass flow rate at a pressure of about 5 Pa. The composition of the laminated CoNi—$SiO_2$ layers was 90 mol % (95 at % Co-5 at % Ni)-10 mol % $SiO_2$ reflecting the composition of the target used for the sputtering. Finally, a protective layer 7 of a carbon film was formed on the top surface of the magnetic layer 6 by sputtering. The protective layer was sputtered to a film thickness of about 7 nm using a carbon target and sputtering gas of argon at about 1 Pa at room temperature.

Figure 2:
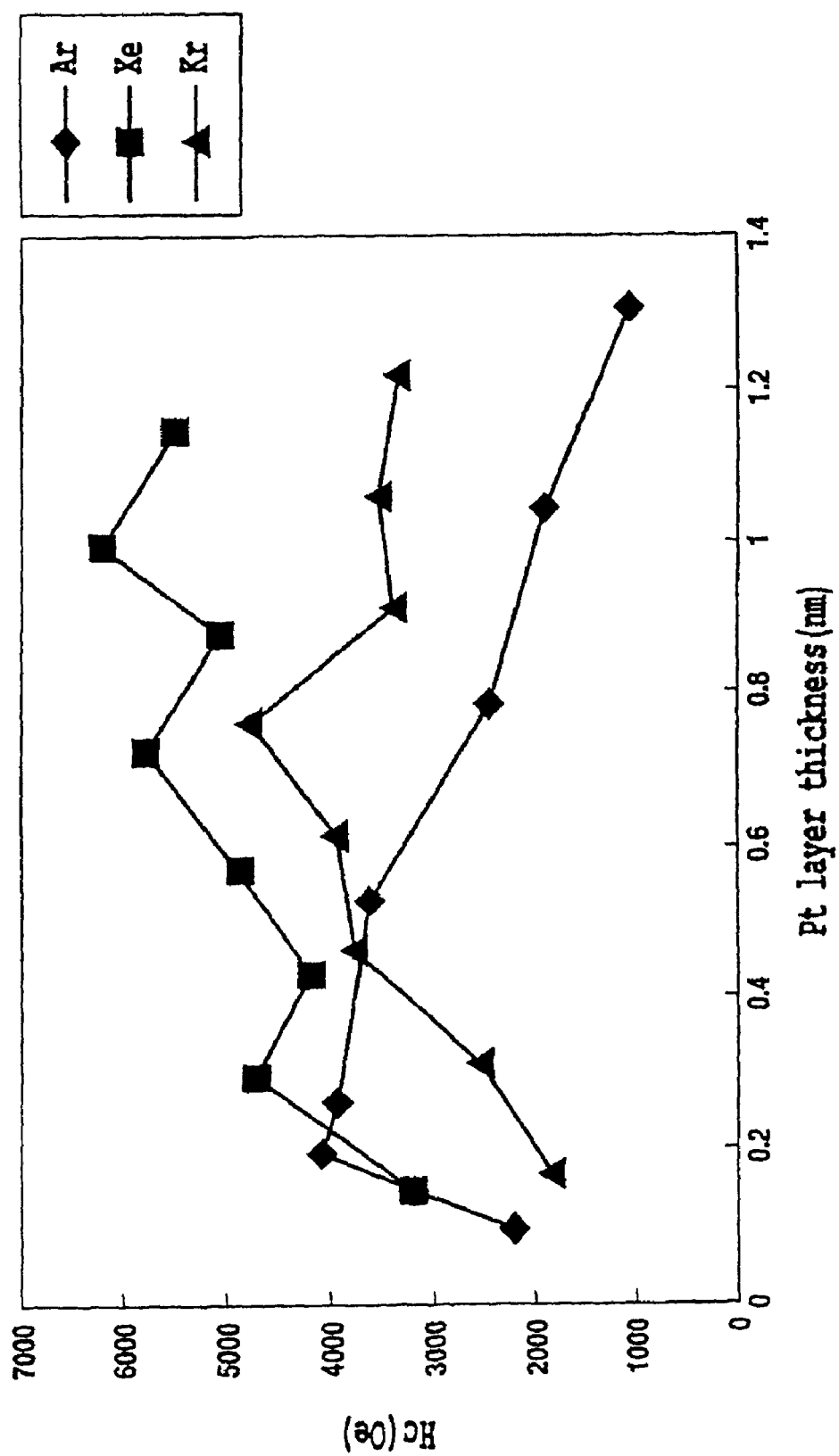
FIG. 2 illustrates the relationship between the platinum layer thickness and the coercive force in a magnetic layer of a multilayered lamination film structure consisting of pure cobalt layers and pure platinum layers sputtered on a substrate using a sputtering gas of argon, krypton, or xenon.
Figure 3:
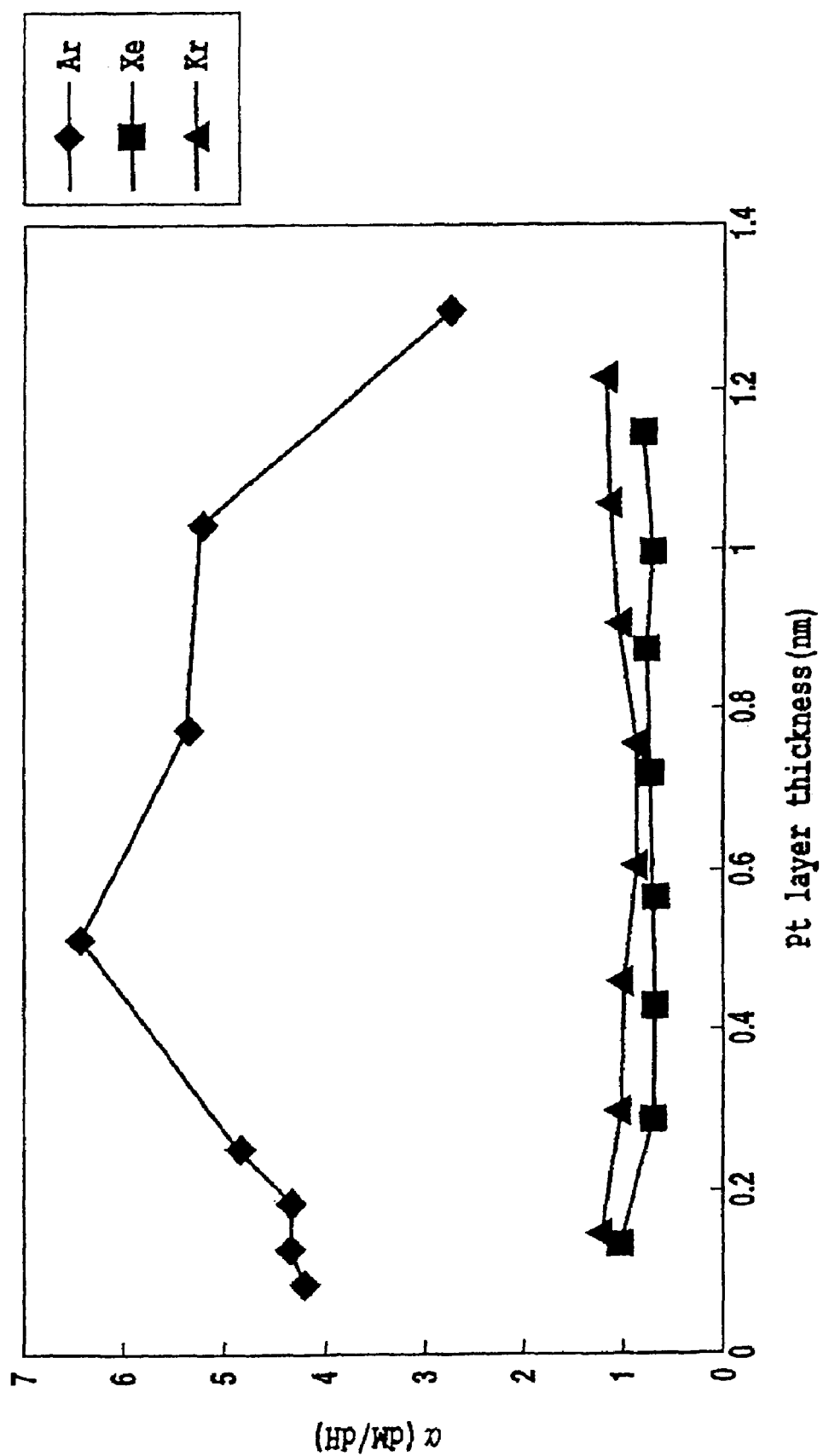
FIG. 3 illustrates the dependence of the gradient in a magnetization curve around the point of Hc on the platinum layer thickness of the magnetic layer composed of a multilayered lamination film structure consisting of pure cobalt layers and pure platinum layers sputtered on a substrate using a sputtering gas of argon, krypton, or xenon.
Figure 4:
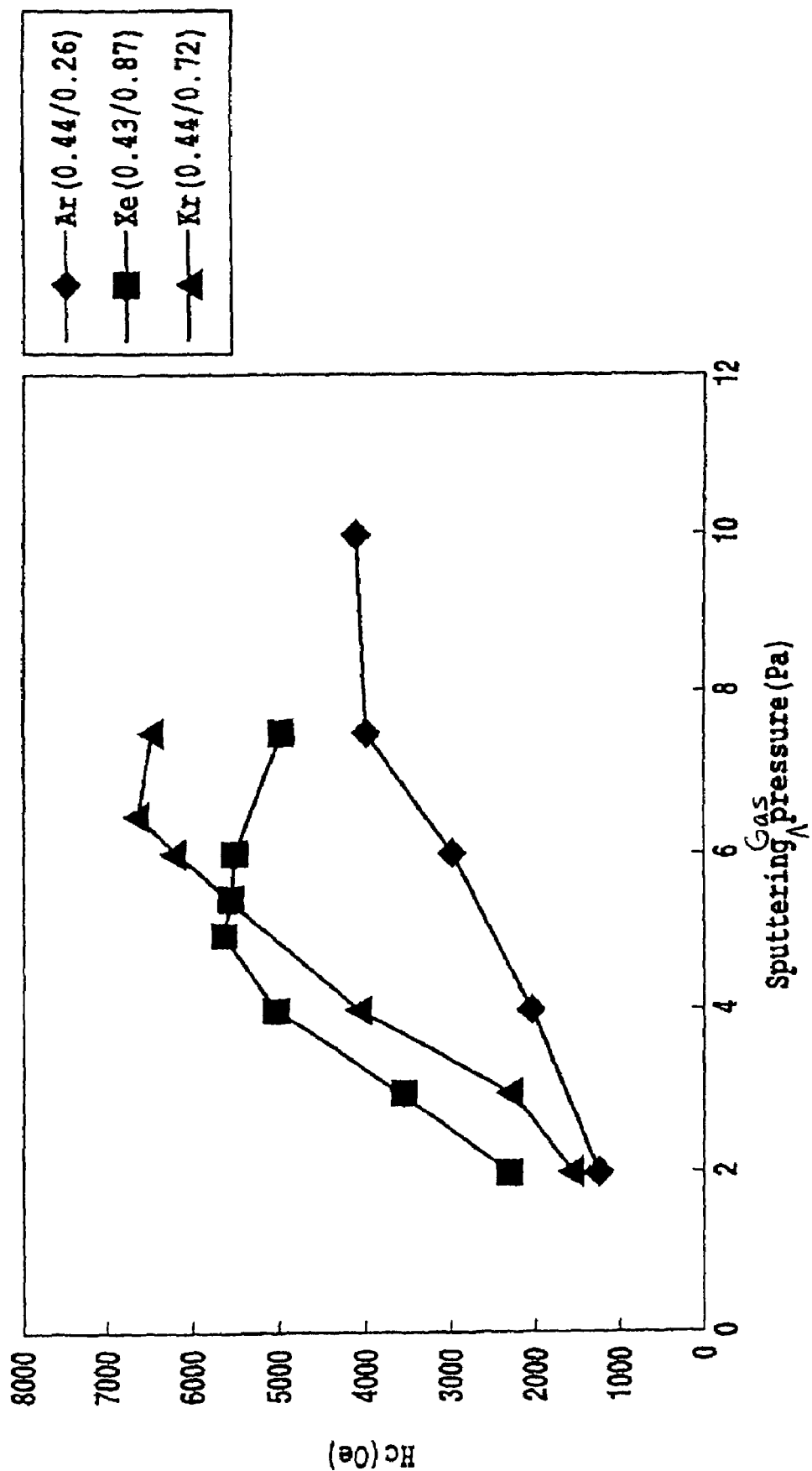
FIG. 4 illustrates the dependence of coercive force Hc on the pressure of sputtering gas for the magnetic layer of a multilayered lamination film structure consisting of pure cobalt layers and pure platinum layers sputtered on a substrate using a sputtering gas of argon, krypton, or xenon.

FIGS. 2–4 illustrate the effects of the sputtering gas used in depositing the magnetic layer 6 on the performances of the magnetic layer 6. FIG. 2 shows the relationship between the platinum layer thickness and the coercive force in a multilayered lamination film consisting of pure cobalt layers (containing neither Ni nor $SiO_2$) and pure platinum layers formed using a sputtering gas of Ar, Kr, or Xe. In the figure, the ordinate represents coercive force and the abscissa represents the platinum film thickness. Sputtering using Ar gas resulted in the maximum coercive force of about 4,000 Oe at a platinum film thickness of 0.2 nm, while the use of Kr gas resulted in the maximum coercive force of about 4,800 Oe at a platinum film thickness of 0.75 nm, and the use of Xe gas resulted in the maximum coercive force of about 6,000 Oe at a platinum film thickness of 1.0 nm. This shows that the platinum film thickness that gives the maximum coercive force varies with the type of the sputtering gas used. The sputtering gas of krypton or xenon provides a perpendicular magnetic recording medium that exhibits a larger coercive force than the use of argon gas.

FIG. 3 illustrates the dependence of the gradient α in a magnetization curve around the point of Hc on the platinum layer thickness of a multilayered lamination film consisting of pure cobalt layers and pure platinum layers formed using a sputtering gas of argon, krypton, or xenon. In the figure, the ordinate represents the gradient a and the abscissa represents the platinum layer thickness. The gradient α of the magnetization curve is an index of the intensity of magnetic interaction between the magnetic particles constituting the magnetic layer 6. Smaller values of the gradient a are considered more favorable. As apparent from FIG. 3, the deposited films using sputtering gas of krypton or xenon showed the a values of approximately unity, while the use of a sputtering gas of argon resulted in the a values larger than three. This demonstrates reduced magnetic interaction between the magnetic particles in the magnetic layers formed using sputtering gases of krypton and xenon, and it means that sputtering using krypton or xenon reduces media noises.

FIG. 4 illustrates the dependence of coercive force Hc on the pressure of sputtering gas for a multilayered lamination film consisting of pure cobalt layers and pure platinum layers formed using a sputtering gas of argon, krypton, or xenon. The ordinate represents the coercive force, and the abscissa represents the gas pressure. The thicknesses of the cobalt layers and the platinum layers are adjusted approximately at the value that gives the maximum coercive force for each kind of gas. Specific values of the layers were: in the case of argon, 0.44 nm for cobalt layers and 0.26 nm for platinum layers, in the case of xenon, 0.43 nm for cobalt layers and 0.87 nm for platinum layers, and in the case of krypton, 0.44 nm for cobalt layers and 0.72 nm for platinum layers. In the case of argon gas, the higher pressure resulted in a larger coercive force within the pressure range up to 10 Pa. In the krypton gas, the maximum coercive force was obtained at the pressure of about 6.5 Pa, and in the xenon gas, the pressure value of about 5 Pa gave the maximum coercive force. The maximum values of the coercive force for the cases of krypton and xenon were larger than the maximum value for the case of argon.

Table 1 gives the evaluation results of crystalline magnetic anisotropy for perpendicular magnetic recording media having a magnetic layer 6 manufactured by using sputtering gases of argon, krypton, and xenon. The larger value of the crystalline magnetic anisotropy constant Ku implies the higher and better thermal stability of the medium.

TABLE 1

| SPUTTERING GAS | Ku (erg/cc) |
| --- | --- |
| Ar | $2.26 \times 10^6$ |
| Kr | $3.60 \times 10^6$ |
| Xe | $3.57 \times 10^6$ |

As apparent from Table 1, the medium having a magnetic layer 6 deposited by using sputtering gases of krypton and xenon showed higher crystalline magnetic anisotropy than the medium formed by using a sputtering gas of argon.

Table 2 gives magnetic cluster sizes in the magnetic layer 6 obtained by a magnetic force microscope (MFM) for each of the media. The smaller magnetic cluster sizes are more favorable for high density recording.

TABLE 2

| SPUTTERING GAS | MAGNETIC CLUSTER SIZE (nm) |
| --- | --- |
| Ar | 47 |
| Kr | 37 |
| Xe | 36 |

As apparent from Table 2, the sputtering gases of krypton and xenon resulted in smaller magnetic cluster sizes and thus are more favorable for higher density recording as compared with the argon sputtering gas. Thus, magnetic performance of a perpendicular magnetic recording medium can be improved by using sputtering gas of krypton or xenon in the deposition process of a magnetic layer 6. Based on the above results, krypton is most favorable for a sputtering gas and a variety of elements as mentioned previously was contained in the cobalt layers in order to improve the read-write characteristics.

Figure 5:
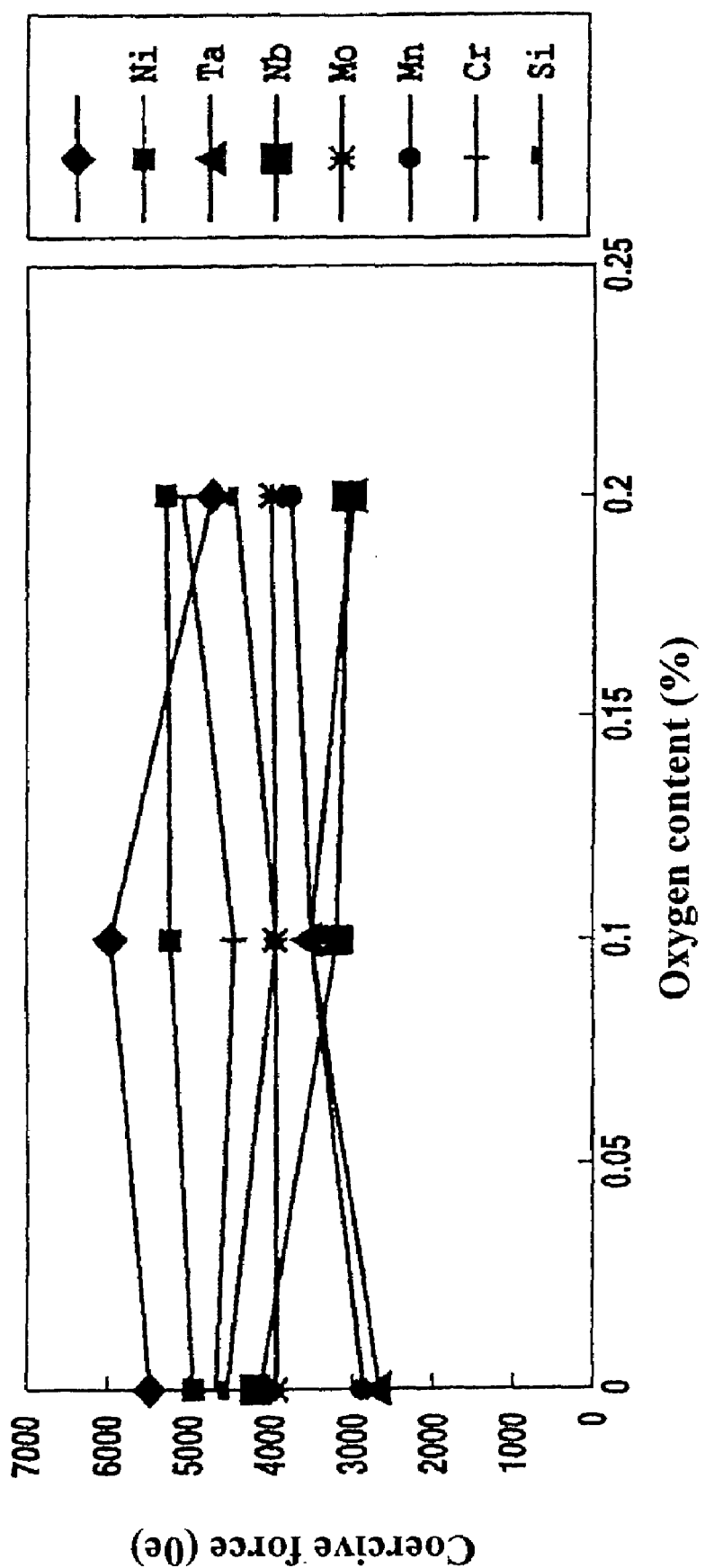
FIG. 5 illustrates the effect of addition of oxygen into the sputtering gas for depositing the magnetic layer.

FIG. 5 illustrates the effect of addition of oxygen into the sputtering gas for depositing the magnetic layer. FIG. 5 shows the coercive force, in relation to the oxygen content in the sputtering gas, of perpendicular magnetic recording media with the cobalt layers constituting the magnetic layer containing an element selected from Ni, Ta, Nb, Mo, Mn, Cr, and Si and the sputtering gas of krypton containing oxygen up to 0.2% in relative mass flow rate. The ordinate represents coercive force and the abscissa represents oxygen content. Although the oxygen content dependence of the coercive force varies with the type of the added element, it has been confirmed that the addition of oxygen improves coercive force. The reason for this improvement can be considered as follows. The additive element can be oxidized by oxygen in the atmosphere of the process and produces oxides that precipitate in the region between the cobalt particles. The oxide can decrease the magnetic interaction between cobalt particles. This can also contribute to improvement in the read-write characteristic described later.

FIG. 6 illustrates the read-write characteristics (specifically, SN characteristics) of a perpendicular magnetic recording medium A having a magnetic layer of a multilayered lamination film consisting of cobalt layers containing 5 at % nickel (95 at % Co-5 at % Ni layers) and platinum layers, medium B containing 95 at % Co-5 at % Ni layers containing 10 mol % of $SiO_2$ (90 mol % (95 at % Co-5 at % Ni)-10 mol % $SiO_2$) and platinum layers, and medium C containing pure cobalt layers and platinum layers for comparison. The ordinate represents a signal-to-noise ratio (SNR) and the abscissa represents linear recording density. All the magnetic layers of these media were deposited using sputtering gas of krypton containing 0.2% of oxygen in a relative mass flow rate. Evaluation of the read-write characteristic was performed using a ring head for longitudinal magnetic recording media.

Although the medium C was possible to read-write up to the limited recording density of around 400 kFCI, the medium A showed significantly improved SNR as compared with the medium C in the region over 200 kFCI, and has demonstrated certified possibility to read-write in the region as high as 550 kFCI. The medium B demonstrated further improvement in SNR than the medium A. It has been confirmed that addition of a metal or an oxide such as nickel or $SiO_2$ into the cobalt layers can improve read-write characteristic and are effective to enhance recording density.

In the second example according to the present invention, a perpendicular magnetic recording medium had a magnetic layer 6 of multilayered lamination structure of CoRu/Pt and a backing layer 2 of a CoZrNb film. The medium was manufactured according to the following method. The substrate 1 is the same as in the first example, namely a glass substrate having a diameter of 3.5 inches and a thickness of 1 mm. Again, the diameter and the thickness, however, are not critical, and the substrate 1 can be an aluminum substrate plated with Ni—P and subjected to an appropriate texturing. After adequately cleaning the substrate 1, a backing layer 2 of a CoZrNb film is formed on the substrate by sputtering. The target used for sputtering in this example has a composition 87 at % Co-5 at % Zr-8 at % Nb. The sputtering was conducted to a film thickness of 200 nm at the room temperature using sputtering gas of argon at a pressure of about 1 Pa. The CoZrNb film exhibits adequate soft magnetic performance notwithstanding of the amorphous state of the film that is deposited at room temperature. Subsequently, an underlayer 5 of platinum was deposited by sputtering on the CoZrNb film. The target used was pure platinum. The sputtering was conducted to a thickness of about 10 nm at room temperature using a mixed gas of Kr+4% Ar+0.2% $O_2$ in a relative mass flow rate at a pressure of about 5 Pa. On the platinum underlayer 5 formed is a magnetic layer 6 of a multilayered lamination film of CoRu/Pt by sputtering. The composition of the target used was 95 at % Co-5 at % Ru for the cobalt layer and pure platinum for the platinum layer. These targets were simultaneously discharged and sputtered while rotating, to deposit a CoRu layer and a platinum layer alternately. The sputtering was conducted to a film thickness of 0.45 nm for each of the CoRu layers and 0.8 nm for each of the platinum layers at room temperature using a sputtering gas of Kr+4% Ar+0.2% $O_2$ in a relative mass flow rate at a pressure of 5 Pa. Finally, a protective layer 7 of a carbon film was formed on the top surface of the magnetic layer 6 by sputtering. The sputtering was conducted to a film thickness of about 7 nm using a carbon target and a sputtering gas of argon at about 1 Pa at room temperature.

FIG. 7 illustrates read-write characteristics (specifically, SN characteristics) of a perpendicular magnetic recording medium (medium D) having a magnetic layer of a multilayered lamination film consisting of cobalt layers containing 5% ruthenium (95 at % Co-5 at % Ru layers) and platinum layers, and of a perpendicular magnetic recording medium (medium E) having a magnetic layer of a multilayered lamination film consisting of 95 at % Co-5 at % Ru layers containing 0.2 mol % of $O_2$(99.8 mol % (95 at % Co-5 at % Ru)-0.2 mol % $O_2$ layers) and platinum layers. Also shown in the figure is a read-write characteristic (specifically, an SN characteristic) of a perpendicular magnetic recording medium (medium F) having a magnetic layer of a multilayered lamination film consisting of pure cobalt layers and platinum layers for comparison. The ordinate represents SNR and the abscissa represents linear recording density. All the magnetic layers of these media were deposited using sputtering gas of krypton containing up to 0.2% of oxygen. Evaluation of the read-write characteristic was performed using a ring head for longitudinal magnetic recording media.

Although the medium F was possible to read-write up to the limited recording density of around 500 kFCI, the medium D showed significantly improved SNR as compared with the medium F, and has demonstrated certified possibility to read-write in the region up to 500 kFCI. The medium E has demonstrated further improvement in SNR than the medium D. It has been confirmed that addition of ruthenium into the cobalt layers, or further addition of oxygen can improve read-write characteristic and are effective to enhance recording density.

A perpendicular magnetic recording medium of the third example according to the present invention comprises, as shown in FIG. 1, a nonmagnetic substrate 1 made of aluminum or the like, and the layers including a soft magnetic backing layer 2, a first seed layer 3, a second seed layer 4, an underlayer 5, a magnetic layer 6 of a multilayered lamination film, and a carbon protective layer 7 sequentially laminated on the substrate in this order.

The magnetic layer 6 of this example uses Co—$SiO_2$/Pt also a multilayered lamination film structure of alternately laminated a Co—$SiO_2$ layer 6a and a platinum layer 6b repetitively laminated. By adding $SiO_2$ in the cobalt layer, the nonmagnetic $SiO_2$ segregates between the cobalt particles, leading to minimization and isolation of cobalt particles. Content of $SiO_2$ in the Co—$SiO_2$ layer is preferably adjusted in the range from 2 to 15 mol %, more preferably in the range from 5 to 11 mol %. By using a ruthenium underlayer 5 with adsorbed oxygen on the surface thereof, the gradient of a magnetization curve at around Hc becomes less steep and the magnetic interaction between the particles in the perpendicular magnetic layer can be decreased, which facilitates read-write.

For the purpose of c-axis orientation of the crystals in the ruthenium underlayer 5 and enhancing coercive force, the first seed layer 3 employs a tantalum layer and the second seed layer 4 employs a NiFeCr layer for controlling the crystal orientation. A composition of the NiFeCr layer is appropriately selected to improve crystallinity and to keep controllability of the crystal orientation of the ruthenium underlayer disposed just on the NiFeCr layer, and is preferably adjusted in the range of 50 to 70 at % Ni-10 to 20 at % Fe-20 to 30 at % Cr.

The thickness of each layer is preferably determined to a value in the range of: 1 to 10 nm for the first seed layer 3, 5 to 15 nm for the second seed layer 4, 10 to 20 nm for the underlayer 5, 0.2 to 0.8 nm for each of the Co—$SiO_2$ layers, and 0.1 to 1 nm for each of the platinum layers.

The soft magnetic CoZrTa backing layer 2 with a thickness of 50 to 400 nm is further provided between the nonmagnetic substrate 1 and the first seed layer 3 to enhance writing ability using a recording head.

The third example is manufactured by the following method. The substrate is an aluminum substrate having a diameter of 3.5 inches and a thickness of 1 mm. As mentioned before, the diameter and the thickness, however, are not critical, and the substrate can be a glass substrate used in the first and second examples. After adequately cleaning the substrate, a backing layer of a soft magnetic CoZrTa film is formed on the substrate by sputtering. The target used here for sputtering has a composition of 92 at % Co-5 at % Zr-3 at % Ta. The sputtering was conducted to a film thickness of 200 nm at the room temperature using sputtering gas of argon at a pressure of about 1 Pa. The CoZrTa film exhibits adequate soft magnetic performance despite the film is in an amorphous state and is deposited at room temperature. Subsequently, a first seed layer 3 of tantalum was deposited by sputtering on this CoZrTa film. The target used was pure tantalum. The sputtering was conducted to a thickness of 5 nm at room temperature using argon gas at a pressure of about 1 Pa. Subsequently, a second seed layer 4 of NiFeCr was deposited by sputtering on the tantalum layer. The target used was 60 at % Ni-15 at % Fe-25 at % Cr. The sputtering was conducted to a thickness of 10 nm using argon gas at a pressure of about 1 Pa at room temperature. On this NiFeCr film, an underlayer 5 of a ruthenium film was deposited by sputtering. The target used was pure ruthenium. The sputtering was conducted to a thickness of about 20 nm using argon gas at a pressure of about 4 Pa at room temperature. The surface of the thus deposited ruthenium underlayer was exposed to a gas atmosphere of Ar+1 to 10% $O_2$ in a relative mass flow rate under a pressure of 0.1 to 10 Pa for 1 to 20 seconds so as to adsorb proper amount of oxygen on the ruthenium surface. On this ruthenium underlayer 5 formed is a perpendicularly oriented magnetic layer 6 of a multilayered lamination film of Co—$SiO_2$/Pt by sputtering. The compositions of the targets used were cobalt containing 9 mol % of $SiO_2$(91 mol % Co-9 mol % $SiO_2$) and pure platinum. These targets were simultaneously discharged and sputtered while rotating, to deposit a Co—$SiO_2$ layer and a platinum layer alternately. The composition of the deposited Co—$SiO_2$ layers was 91 mol % Co-9 mol % $SiO_2$ reflecting the composition of the target used for depositing these layers. The sputtering was conducted using argon gas at a pressure of 5 Pa at room temperature. The thickness of each of the Co—$SiO_2$ layers was 0.3 nm, and the thickness of each of the platinum layers was 0.1 nm. Finally, a protective layer 7 of a nitrogen-doped carbon (C:N) film was formed on the top surface of the magnetic layer 6 by sputtering. The sputtering was conducted to a film thickness of 7 nm under argon gas pressure of about 1 Pa and at room temperature.

FIG. 8 illustrates an effect of the crystal orientation control layer included in a perpendicular magnetic recording medium according to the present invention. FIG. 8 shows an X-ray diffraction pattern obtained on a sample prepared by sequentially depositing first and second seed layers of tantalum and NiFeCr respectively, a ruthenium underlayer 5, and a Co—$SiO_2$/Pt magnetic layer 6 of a multilayered lamination structure. As apparent from the figure, solely observed diffraction from the ruthenium underlayer 5 was the diffraction from (002) plane, which indicated that the orientation control layers (3 and 4) effectively worked for the c-axis orientation of the ruthenium underlayer 5.

FIG. 9 illustrates the effect of oxygen adsorption on the surface of the ruthenium underlayer 5. FIG. 9 shows a magnetization curve obtained on a perpendicular magnetic recording medium manufactured of the third example. Unit of the abscissa is 'Oe' and unit of the ordinate is 'emu'. The figure indicates that the gradient of the magnetization curve at around the coercive force Hc is less steep and the magnetic interaction between magnetic particles constituting the magnetic layer is decreased. The adsorption of oxygen on the surface of the ruthenium underlayer 5 has been demonstrated to facilitate read-write on a magnetic recording layer.

Table 3 shows the coercive force of a medium comprising a Co—$SiO_2$/Pt magnetic layer according to the present invention in comparison with the coercive force of a medium comprising a Co—B/Pt magnetic layer based on conventional technology. The Co—B/Pt magnetic layer was a multilayered lamination film of Co—B layers that are boron-containing cobalt layers, and platinum layers. The underlayer for the Co—B/Pt magnetic layer was a platinum layer.

TABLE 3

| SAMPLE | COERCIVE FORCE Hc (Oe) | SQUARENESS S | SATURATION MAGNETIZATION Ms (emu/cc) | NUCLEATION FIELD Hn (Oe) | GRADIENT α |
|---|---|---|---|---|---|
| Pt/(CoB/Pt) | 5,120 | 1.0 | 348 | 4,500 | 8.5 |
| Ru/(CoSiO$_2$/Pt) | 6,290 | 1.0 | 542 | 2,500 | 1.8 |

The coercive force of the Co—$SiO_2$/Pt magnetic layer according to the present invention has been demonstrated higher than that of the Co—B/Pt magnetic layer by more than 1,000 Oe. The gradient a of a magnetization curve is remarkably decreased from 8.5 to 1.8. As shown above, a perpendicular magnetic recording medium has been obtained that exhibits simultaneously high coercive force and gentle gradient in a magnetization curve by provision of a multilayered lamination of alternately layered Co—SiO$_2$ layer and platinum layer on a ruthenium underlayer 5.

Table 4 shows evaluation results of crystalline magnetic anisotropy for these two types of perpendicular magnetic recording media. Larger value of a crystalline magnetic anisotropy constant (Ku) means higher thermal stability of a medium.

TABLE 4

| SAMPLE | Ku (erg/cc) |
| --- | --- |
| Pt/(CoB/Pt) | $5.0 \times 10^6$ |
| Ru/(CoSiO$_2$/Pt) | $5.3 \times 10^6$ |

As apparent from Table 4, the Ku value of the Co—SiO$_2$/Pt magnetic layer according to the present invention is larger than the Ku value of the Co—B/Pt, indicating improvement in thermal stability. Thus, superior magnetic characteristics of a perpendicular magnetic recording medium of the present invention have been shown in comparison with a conventional perpendicular magnetic recording medium.

FIG. 10 illustrates readback signal output, which is a read-write characteristic, measured on a conventional product and an invented product. The abscissa of the graph represents linear recording density and the ordinate represents TAA (Track Average Amplitude). The measurement was conducted using a ring head for a longitudinal magnetic recording medium. The conventional medium comprising a lamination consisting of Co—B layers and platinum layers on a platinum underlayer was possible up to only the limited recording density of around 400 kFCI, while the present medium comprising a lamination consisting of Co—SiO$_2$ layers and platinum layers on a ruthenium underlayer was possible to detect readback signals up to 540 kFCI or higher recording density. Thus, it has been shown that readback is possible in the high linear recording density.

FIG. 11 illustrates the media noise, which is a read-write characteristic, measured on the conventional medium and the medium according to the present invention. The abscissa of the graph represents linear recording density and the ordinate represents the noise. This measurement was also conducted using a ring head for a longitudinal magnetic recording medium. The conventional medium comprising a lamination of Co—B layers and platinum layers on a platinum underlayer showed decreased medium noise in the recording density region beyond 200 KFCI, indicating insufficient read-write. Moreover, the magnitude of the noise itself was large. In contrast, the present medium comprising a lamination of Co—SiO$_2$ layers and platinum layers on a ruthenium underlayer showed lower noise than the conventional product in the whole linear recording density range. In addition, increase of the noise was observed up to the linear recording density of 540 kFCI, confirming sufficient read-write performance.

FIG. 12 illustrates the SNR, which is a read-write characteristic, measured on the conventional medium and the present medium. The abscissa of the graph represents linear recording density and the ordinate represents SNR. This measurement was also conducted using a ring head for a longitudinal magnetic recording medium. The invented medium comprising a lamination of Co—SiO$_2$ layers and platinum layers showed remarkably higher SNR in the whole range of linear recording density than the conventional medium comprising a lamination of Co—B layers and platinum layers, and the present medium also demonstrated sufficient read-write ability up to the linear recording density of 540 kFCI.

It has been confirmed that the constitution of a perpendicular magnetic recording medium according to the present invention is effective to improve read-write characteristics and can contribute to enhance recording density.

A perpendicular magnetic recording medium in the fourth example according to the present invention comprises an aluminum substrate 1 and the layers laminated on this substrate in sequence including a soft magnetic backing layer 2 of CoZrNb, an orientation control layer (3 and 4) of double layer structure, an underlayer 5 of ruthenium, and a magnetic layer 6 that is a multiple of laminations of Co—SiO$_2$ layers and platinum layers. The orientation control layer of the fourth example employs a first layer of tantalum and second layer of NiFeNbB layer 4. The aluminum substrate 1 in the fourth example has a diameter of 3.5 inches and a thickness of 1 mm. Again, the diameter and the thickness are not critical. The aluminum substrate can be replaced by a glass substrate.

The fourth example is manufactured according to the following method. After adequately cleaning the substrate 1, a backing layer 2 was formed on the substrate with a soft magnetic CoZrNb film by a sputtering method. The sputtering target used here has a composition of 87 at % Co-5 at % Zr-8 at % Nb. The sputtering was conducted to a film thickness of 200 nm at the room temperature using sputtering gas of argon at a pressure of about 1 Pa. The CoZrNb film exhibits adequate soft magnetic performance despite the film is in an amorphous state and is deposited at room temperature. Subsequently, a first seed layer 3 of a tantalum layer was deposited by sputtering on the CoZrNb soft magnetic film. The target used was pure tantalum. The sputtering was conducted to a thickness of 5 nm at room temperature using argon gas at a pressure of about 1 Pa. Subsequently, a second seed layer 4 of a NiFeNbB layer was deposited by sputtering on the tantalum film. The target used was 79 at % Ni-12 at % Fe-3 at % Nb-6 at % B. The sputtering was conducted to a thickness of 30 nm using argon gas under a pressure of about 1 Pa at room temperature. On this NiFeNbB layer, an underlayer 5 of a ruthenium film was deposited by sputtering. The target used was pure ruthenium. The sputtering was conducted to a thickness of about 20 nm using argon gas at a pressure of about 4 Pa at room temperature. The surface of the thus deposited ruthenium underlayer was exposed to a gas atmosphere of Ar+2% O$_2$ in a relative mass flow rate under a pressure of 1 Pa for about 10 seconds so as to adsorb proper amount of oxygen on the ruthenium surface. On the ruthenium underlayer 5 formed is a magnetic layer 6 that is a perpendicularly oriented multilayered lamination film of Co—SiO$_2$/Pt by sputtering. The composition of the target used for the Co—SiO$_2$ layer was 91 mol % Co-9 mol % SiO$_2$ or 94 mol % Co-6 mol % SiO$_2$; and the composition of the target used for the platinum layer was pure platinum. These two targets were simultaneously discharged and sputtered while rotating, to alternately deposit a Co—SiO$_2$ layer and a platinum layer repetitively. The sputtering was conducted using argon gas at a pressure of 5 Pa at room temperature. The thickness of each of the Co—SiO$_2$ layers was 0.3 nm, and thickness of each of the platinum layers was 0.1 nm. The composition of the Co—SiO$_2$ layers was 91 mol % Co-9 mol % SiO$_2$ or 94 mol % Co-6 mol % SiO$_2$ reflecting the composition of the target. Finally, a protective layer 7 of a nitrogen-doped carbon (C:N) film was formed on the top surface of the magnetic layer 6 by a sputtering method using a target of carbon and a sputtering gas of Ar+4% $N_2$ in a relative mass flow rate under a pressure of about 1 Pa at room temperature.

FIG. 13(a) and FIG. 13(b) are planar TEM images illustrating the diameter of magnetic particles and the width of nonmagnetic grain boundary in the Co—$SiO_2$ layer constituting the magnetic layer 6. FIG. 13(a) is on a sample containing $SiO_2$ additive of 6 mol %, and FIG. 13(b) is on a sample containing $SiO_2$ additive of 9 mol %. Analysis on the TEM images indicated that the sample of $SiO_2$ additive of 6 mol % (FIG. 3(a)) had a mean diameter of magnetic particles of 7.1 nm and a mean width of grain boundary of 1.5 nm, while the sample of $SiO_2$ additive of 9 mol % (FIG. 3(b)) had a mean diameter of magnetic particles of 5.6 nm and a mean width of grain boundary of 1.6 nm. Increasing the $SiO_2$ content tends to produce a smaller diameter of magnetic particles and a wider grain boundary. Generally, a small grain size of the magnetic particles implies reduced magnetic interaction between magnetic particles and intensified isolation of individual magnetic particles, which are favorable to direct to high recording density.

FIGS. 14(a) and 14(b) illustrate the variation of the magnetic characteristics in relation to the variation of the thickness of a platinum layer 6b. FIG. 14(a) shows dependence of coercive force Hc on the platinum film thickness, and FIG. 14(b) shows dependence of gradient a of the magnetization curve on the platinum film thickness. The Hc value was 6,000 Oe at a platinum film thickness of 0.12 nm, while the Hc was zero when the thickness was zero, which means that a platinum film was not provided. The Hc value decreased to 1,200 Oe at a platinum film thickness of 0.25 nm, and further decreased with increase of the film thickness. The a value was 1.5 at the platinum film thickness of 0.12 nm, with a tendency to increase with increase of the platinum film thickness. Accordingly, thinner the thickness of the platinum film is better in view of the α value. The optimum thickness of the platinum layer was 0.12 nm in this specific example.

FIGS. 15(a) and 15(b) illustrate the variation of the magnetic characteristics in relation to the variation of the thickness of the NiFeNbB layer 4. FIG. 15(a) shows noise at 400 kFCI, which is a read-write characteristic. FIG. 15(b) shows SNR at 400 kFCI. The magnetic characteristics are also shown for comparison in the case a NiFeCr layer 10 nm thick was provided in place of the NiFeNbB layer. As shown in FIG. 15(a), the noise attenuates when the thickness of the NiFeNbB layer is increased from 10 nm to 30 nm. The noise level for the NiFeNbB layer having a thickness of 30 nm is lower than that for the NiFeCr layer having a thickness of 10 nm. FIG. 15(b) shows that the SNR values for the case provided with the NiFeNbB layer are higher than the SNR for the NiFeCr layer 10 nm thick, independently of the film thickness of the NiFeNbB layer.

As described above, it has been shown that the grain size of the magnetic particles and the width of the nonmagnetic grain boundary can be controlled by controlling $SiO_2$ content in the cobalt layer; that a high Hc value can be achieved by optimizing the platinum layer thickness; and that noises and SNR can be improved by replacing the layer disposed just beneath the ruthenium layer of the NiFeCr layer in the third example by a NiFeNbB layer 10 to 30 nm thick in the fourth example. Thus, a perpendicular magnetic recording medium can be provided that achieves higher recording density.

A perpendicular magnetic recording medium of the fifth example according to the present invention has nearly the same construction as that of fourth example, except that the magnetic layer 6 is a multilayered lamination structure of Co—$SiO_2$/Pd. The compositions of the targets used were 91 mol % Co-9 mol % $SiO_2$ and pure palladium. These targets were simultaneously discharged and sputtered while rotating, to alternately deposit a Co—$SiO_2$ layer and a palladium layer repetitively. The sputtering was conducted using argon gas at a pressure of 5 Pa at room temperature. The thickness of each of the Co—$SiO_2$ layers was 0.3 nm, and the thickness of each of the palladium layers was 0.72 nm.

FIGS. 16(a) and 16(b) illustrate the variation of the magnetic characteristics in relation to the variation of the thickness of a palladium layer 6b. FIG. 16(a) shows dependence of coercive force Hc on the palladium film thickness, and FIG. 16(b) shows dependence of gradient a of the magnetization curve on the palladium film thickness. The Hc value increases with increase of the palladium film thickness to reach a saturation value of 5,500 Oe at the thickness of 0.72 nm. On the other hand, the a value is about 2 almost independently on the palladium film thickness, indicating satisfactorily weak magnetic interaction between magnetic particles.

FIGS. 17(a) and 17(b) illustrate the effect of the ruthenium underlayer 5 on the magnetic performance of a magnetic layer 6 of Co—$SiO_2$/Pd multilayered lamination structure. FIG. 17(a) shows noise, which is a type of read-write characteristic, and FIG. 17(b) shows SNR. The data for the cases of platinum underlayer and palladium underlayer are also shown for comparison. As apparent from FIG. 17(a), the underlayer of a platinum film or a palladium film causes much noise and does not allow sufficient read-write in the region of high recording density. In contrast, the use of the ruthenium underlayer accomplishes low noise and sufficient read-write in the high recording density region. The SNR data shown in FIG. 17(b) also shows excellent performance obtained by the use of the ruthenium underlayer.

FIGS. 18(a), 18(b), and 18(c) illustrate the read-write characteristics measured on the perpendicular magnetic recording medium having a magnetic layer of Co—$SiO_2$/Pt multilayered lamination structure of the fourth example and the perpendicular magnetic recording medium having a perpendicular magnetic layer of Co—$SiO_2$/Pd multilayered lamination structure of the fifth example. FIG. 18(a) gives readback signal output (TAA), FIG. 18(b) gives the noise, and FIG. 18(c) gives the SNR. Both the readback signal output and the noise are smaller in the perpendicular magnetic recording medium having a perpendicular magnetic layer of Co—$SiO_2$/Pd multilayered lamination structure. The SNR, however, is equivalent to the performance in the perpendicular magnetic recording medium having a magnetic layer of Co—$SiO_2$/Pt of multilayered lamination structure. Thus, a perpendicular magnetic layer of a Co—$SiO_2$/Pd multilayered lamination structure can provide, in combination with the provision of a ruthenium underlayer, a perpendicular magnetic recording medium of excellent performance.

A perpendicular magnetic recording medium in the sixth example according to the present invention comprises an aluminum substrate 1 and the layers laminated on this substrate in sequence including a backing layer 2 of CoZrNb, an orientation control layer of double layer structure consisting of a tantalum layer 3 and a NiFeCr layer 4, an underlayer 5 of ruthenium, and a magnetic layer 6 that is a multiple of laminations of cobalt layers of Co—$SiO_2$ and platinum layers of Pt—$SiO_2$. A carbon film was used for a protective layer 7.

The sixth example is manufacturing according to the following method. The aluminum substrate 1 has a diameter of 3.5 inches and a thickness of 1 mm. Again, the diameter and the thickness are not critical. A glass substrate can be used as well. After adequately cleaning the substrate 1, a backing layer 2 was formed on the substrate depositing a CoZrNb film by a sputtering method. The target used here for sputtering has a composition of 87 at % Co-5 at % Zr-8 at % Nb. The sputtering was conducted to a film thickness of 200 nm at the room temperature using sputtering gas of argon at a pressure of about 1 Pa. The CoZrNb film exhibits adequate soft magnetic performance despite the film is in an amorphous state and is deposited at room temperature. Subsequently, a first seed layer 3 of a tantalum layer was deposited by sputtering on the CoZrNb film. The target used was pure tantalum. The sputtering was conducted to a thickness of 3 nm at room temperature using argon gas at a pressure of about 1 Pa. Subsequently, a second seed layer 4 of a NiFeCr layer was deposited by sputtering on this tantalum layer. The target used was 60 at % Ni-15 at % Fe-25 at % Cr. The sputtering was conducted to a thickness of 10 nm using argon gas under a pressure of about 1 Pa at room temperature. The two layers, tantalum layer and the NiFeCr layer, constitute an orientation control layer and orients a ruthenium layer, which is an underlayer formed on the orientation control layer, in the c-axis. On this NiFeCr layer, an underlayer 5 of a ruthenium film was deposited by sputtering. The target used was pure ruthenium. The sputtering was conducted to a thickness of about 20 nm using argon gas at a pressure of about 4 Pa at room temperature. The surface of the thus deposited ruthenium underlayer was exposed to a gas atmosphere of Ar+2% $O_2$ in a relative mass flow rate under a pressure of 1 Pa for about 10 seconds so as to adsorb proper amount of oxygen on the ruthenium surface. By using a ruthenium underlayer 5 with adsorbed oxygen on the surface thereof, the gradient of a magnetization curve at around Hc becomes less steep and the magnetic interaction between the particles constituting the magnetic layer can be decreased. On this ruthenium underlayer 5 formed is a perpendicularly oriented magnetic layer 6 that is a multilayered lamination film of Co—$SiO_2$/Pt—$SiO_2$ by sputtering. The composition of the target used for the Co—$SiO_2$ layer was 91 to 94 mol % Co-6 to 9 mol % $SiO_2$ and the composition of the target used for the Pt—$SiO_2$ layer was 95 mol % Pt-5 mol % $SiO_2$. These two targets were simultaneously discharged and sputtered while rotating, to alternately deposit a Co—$SiO_2$ layer and a Pt—$SiO_2$ layer repetitively. The sputtering was conducted using argon gas at a pressure of 5 Pa at room temperature. The thickness of each of the Co—$SiO_2$ layers was 0.3 nm, and the thickness of each of the Pt—$SiO_2$ layers was 0.07 to 0.25 nm. Finally, a protective layer 7 of a nitrogen-doped carbon (C:N) film was formed on the top surface of the magnetic layer 6 by a sputtering method using a target of carbon and a sputtering gas of Ar+4% $N_2$ in a relative mass flow rate under a pressure of about 1 Pa at room temperature.

FIG. 19 illustrates Hc of three types of a perpendicular magnetic recording media in relation to thickness of a noble metal layer 6b of each medium. First of the three types of media comprises a magnetic layer of a multilayered lamination film of 91 mol % Co-9 mol % $SiO_2$/95 mol % Pt-5 mol % $SiO_2$. Second of the three types of media comprises a magnetic layer of a multilayered lamination film of 94 mol % Co-6 mol % $SiO_2$/95 mol % Pt-5 mol % $SiO_2$. Third of the three types of media comprises a magnetic layer of a multilayered lamination film of 91 mol % Co-9 mol % $SiO_2$/Pt. In the cases where $SiO_2$ content in the mainly-cobalt layer of cobalt layer is 9 mol %, Hc of the medium including 5 mol % of $SiO_2$ in the platinum layer was observed lower by 300 to 500 Oe than that of the medium without $SiO_2$ additive. However, in the case where $SiO_2$ content in the mainly-cobalt layer of cobalt layer is 6 mol %, the Hc of the medium including 5 mol % of $SiO_2$ in the platinum layer showed remarkably high Hc values.

FIG. 20 illustrates the values of gradient a in the magnetization curve around the Hc point obtained on the above-mentioned three types of perpendicular magnetic recording media, in relation to the thickness of the noble metal layer 6b. It is apparent from the figure that the optimum thickness of the noble metal layer exists to minimize the a value for each type of medium. Comparing the medium comprising a magnetic layer of a multilayered lamination film of 91 mol % Co-9 mol % $SiO_2$/95 mol % Pt-5 mol % $SiO_2$ with the medium comprising a magnetic layer of a multilayered lamination film of 91 mol % Co-9 mol % $SiO_2$/Pt, the medium including the $SiO_2$ additive in the platinum layer showed lower a values by 0.15 to 0.4 in the whole range of the thickness of the noble metal layer. Considering that the a value indicates the strength of magnetic interaction between the magnetic particles, addition of $SiO_2$ into the platinum layer decreases the degree of magnetic interaction between the magnetic particles, and consequently reduces noise.

FIG. 21 illustrates dependence of magnetic anisotropy constant Ku on thickness of the noble metal layer 6b for a medium comprising a magnetic layer of a multilayered lamination film of 91 mol % Co-9 mol % $SiO_2$/95 mol % Pt-5 mol % $SiO_2$ and a medium comprising a magnetic layer of a multilayered lamination film of 91 mol % Co-9 mol % $SiO_2$/Pt. The two types of media showed approximately equal Ku values, indicating that the addition of $SiO_2$ into the platinum layer does not degrade the Ku value.

FIG. 22 illustrates dependence of Hc value on the $SiO_2$ content in the cobalt layer measured on the medium comprising a magnetic layer of a multilayered lamination of Co—$SiO_2$/Pt containing 18 to 38 vol % of $SiO_2$ in the cobalt layer. Conversion from mol % to vol % is done as follows:

| | |
|---|---|
| Vol % of $SiO_2$ in a cobalt layer = | (mol % of $SiO_2$/100 * vol per mol of $SiO_2$) * 100/[mol % of $SiO_2$/100 * vol per mol of $SiO_2$ + (1 − mol % of $SiO_2$/100) * vol per mol of Co], and |
| Vol % of $SiO_2$ in a platinum layer = | (mol % of $SiO_2$/100 * vol per mol of $SiO_2$) * 100/[mol % of $SiO_2$/100 * vol per mol of $SiO_2$ + (1 − mol % of $SiO_2$/100) * vol per mol of Pt]. |

The values of vol per mol of $SiO_2$, Co, and Pt are 23.11, 6.58, and 9.09 (cm$^3$/mol), respectively.

As is apparent from FIG. 22, the Hc value of a medium sharply drops with increase of $SiO_2$ content in the cobalt layer. This means that high Hc value becomes hardly attainable when the $SiO_2$ is intended to much segregate in the grain boundary region between magnetic particles and isolation of magnetic particles is enhanced with the intention of noise reduction.

FIG. 23 illustrates the effect of $SiO_2$ addition into platinum layer on the Hc value. The figure compares the Hc values of the media comprising a magnetic layer of a multilayered lamination film of Co—$SiO_2$/Pt—$SiO_2$ with the Hc values of the media comprising a magnetic layer of a multilayered lamination film of Co—$SiO_2$/Pt that does not contain $SiO_2$ in the platinum layer.

As is explained above with reference to FIG. 22, in the medium comprising a magnetic layer including a cobalt layer containing $SiO_2$ and a platinum layer not containing $SiO_2$, the Hc value abruptly decreases with increase of the content of the $SiO_2$ in the cobalt layer. However, when the platinum layer also contains $SiO_2$ as well as the $SiO_2$ addition to the cobalt layer, the decreasing rate of the Hc value is relaxed. When $SiO_2$ is contained not only in the cobalt layers but also in the platinum layers, a larger amount of $SiO_2$ can be added in a medium exhibiting the same Hc value as a medium without $SiO_2$ in the platinum layers. As a result, more amount of $SiO_2$ is segregated in the grain boundary region between magnetic particles enhancing isolation of each magnetic particle, leading to noise reduction.

As described so far, a perpendicular magnetic recording medium according to the present invention comprises a magnetic layer that has a basic structure of a multilayered lamination film composed by laminating a cobalt layer and a platinum layer (or a palladium layer) repetitively, at least one type of layers of the cobalt layers and the platinum layers (or the palladium layers) containing an oxide of an element, for example, silicon. The magnetic layer is formed on an underlayer of ruthenium, for example, provided for reducing magnetic interaction between magnetic particles constituting the magnetic layer. The surface of the underlayer is treated for oxygen adsorption before depositing the magnetic layer to suppress magnetic interaction between magnetic particles in the magnetic layer. Thus, a perpendicular magnetic recording medium is provided that exhibits high recording density and excellent read-write characteristics.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosures of the priority applications, JP 2002-259287, JP 2002-306144, JP 2003-031415, and JP 2003-144092, in their entirety, including the drawings, claims, and the specification thereof, are incorporated herein by reference.

What is claimed is:

1. A perpendicular magnetic recording medium comprising:
    a nonmagnetic substrate;
    a magnetic layer having a multilayered lamination structure of alternately laminated cobalt layers containing mainly cobalt and noble metal layers of platinum or palladium; and
    an underlayer between the magnetic layer and the substrate, the magnetic layer being formed directly on the underlayer,
    wherein at least one of the cobalt layers and the noble metal layers contains at least one element selected from the group consisting of Ru, Ta, Nb, Mo, Mn, Cr, Si, and Ni, or at least one oxide,
    wherein the underlayer consists of ruthenium.

2. A perpendicular magnetic recording medium according to claim 1, wherein each of the cobalt layers has a thickness ranging from 0.2 to 0.8 nm and each of the noble metal layers has a thickness ranging from 0.05 to 1.2 nm.

3. A perpendicular magnetic recording medium according to claim 1, wherein the thickness of the underlayer ranges from 1 to 20 nm.

4. A perpendicular magnetic recording medium according to claim 1, further including an orientation control layer between the substrate and the underlayer for controlling crystalline orientation of the underlayer.

5. A perpendicular magnetic recording medium according to claim 4, wherein the orientation control layer is composed of a lamination of a first seed layer and a second seed layer, and a composition of the second seed layer is selected so as to orient the underlayer in a c-crystal axis.

6. A perpendicular magnetic recording medium according to claim 5, wherein the first seed layer is composed of a tantalum layer and the second seed layer is composed of a layer selected from a NiFeCr layer, a NiFeNbB layer, and a NiFeSi layer.

7. A perpendicular magnetic recording medium according to claim 5, wherein the thickness of the first seed layer ranges from 1 to 10 nm, and the thickness of the second seed layer ranges from 5 to 20 nm.

8. A perpendicular magnetic recording medium according to claim 5, further including a soft magnetic backing layer between the substrate and the first seed layer.

9. A perpendicular magnetic recording medium according to claim 8, wherein the backing layer is composed of a CoZrNb alloy or a CoZrTa alloy having a thickness ranging from 50 to 400 nm.

10. A method of manufacturing a perpendicular magnetic recording medium comprising the steps of:
    providing a nonmagnetic substrate;
    depositing an underlayer on the substrate; and
    depositing, directly on the underlayer, a magnetic layer having a multilayered lamination structure by alternately laminating cobalt layers mainly containing cobalt and noble metal layers of platinum or palladium,
    wherein at least one of the cobalt layers and the noble metal layers contains at least one element selected from the group consisting of Ru, Ta, Nb, Mo, Mn, Cr, Si, and Ni, or at least one oxide, and
    wherein the underlayer consists of ruthenium.

11. A method for manufacturing a perpendicular magnetic recording medium according to claim 10, wherein the magnetic layer is deposited with a sputtering gas containing oxygen ranging from 0.05 to 0.5% in a relative mass flow rate.

12. A method for manufacturing a perpendicular magnetic recording medium according to claim 10, wherein the underlayer and the magnetic layer are deposited using a sputtering gas selected from krypton, xenon, a mixture of krypton and argon, and a mixture of xenon and argon.

13. A method for manufacturing a perpendicular magnetic recording medium according to claim 10, further comprising the step of adsorpting oxygen on the underlayer surface after depositing the underlayer and before depositing the magnetic layer, the adsorption step including exposing the surface of the underlayer to argon gas containing 1 to 10% of oxygen in relative mass flow rate under a pressure ranging from 0.1 to 10 Pa for 1 to 20 seconds.

* * * * *